US012806654B2

(12) United States Patent
Wakabayashi et al.

(10) Patent No.: US 12,806,654 B2
(45) Date of Patent: Nov. 24, 2026

(54) VIBRATION GENERATION DEVICE, VIBRATION REDUCTION DEVICE, AND ELECTRONIC APPARATUS

(71) Applicant: SEIKO EPSON CORPORATION, Tokyo (JP)

(72) Inventors: Shinichi Wakabayashi, Suwa (JP); Tatsuya Takahashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 734 days.

(21) Appl. No.: 18/175,619

(22) Filed: Feb. 28, 2023

(65) Prior Publication Data

US 2023/0311160 A1 Oct. 5, 2023

(30) Foreign Application Priority Data

Feb. 28, 2022 (JP) ................................. 2022-029122

(51) Int. Cl.

| | |
|---|---|
| ***B06B 1/04*** | (2006.01) |
| ***F16F 15/00*** | (2006.01) |
| ***F16F 15/03*** | (2006.01) |
| ***G03B 21/14*** | (2006.01) |
| ***H02K 33/16*** | (2006.01) |

(52) U.S. Cl.

CPC ............ *B06B 1/045* (2013.01); *F16F 15/002* (2013.01); *F16F 15/03* (2013.01); *G03B 21/145* (2013.01); *H02K 33/16* (2013.01)

(58) Field of Classification Search

CPC ......... B06B 1/045; F16F 15/002; F16F 15/03; G03B 21/145; H02K 33/16

See application file for complete search history.

(56) References Cited

U.S. PATENT DOCUMENTS

2005/0257620 A1* 11/2005 Kawauchi .......... G01C 19/5642 73/662
2009/0090166 A1* 4/2009 Talley .................... G01N 3/303 73/12.06
2012/0248938 A1* 10/2012 Kawanishi ........... H03H 9/0595 310/370
2013/0211630 A1 8/2013 Storm et al.
2014/0265731 A1 9/2014 Storm et al.
2015/0188515 A1* 7/2015 Yamada ............. H03H 9/02102 331/156
2015/0326201 A1* 11/2015 Nishimura ............. H03H 9/215 310/366

(Continued)

FOREIGN PATENT DOCUMENTS

JP 2001-304332 A 10/2001
JP 2008246413 A * 10/2008

(Continued)

*Primary Examiner* — Scott T Baderman

(74) *Attorney, Agent, or Firm* — Dority & Manning, P.A.

(57) ABSTRACT

A vibration generation device includes: a base configured to transmit vibration to an object; an arm provided at the base swingably around a rotation axis; and at least one driving unit including a magnet, and a coil disposed to face the magnet in a non-contact manner, and configured to swing the arm. One of the magnet and the coil is disposed at a position separated from the rotation axis at the arm. The arm includes a disposition portion provided at a position separated from the rotation axis at the arm, and a weight portion detachably attached to the disposition portion.

9 Claims, 21 Drawing Sheets

(56) References Cited

U.S. PATENT DOCUMENTS

| | | | | |
|---|---|---|---|---|
| 2016/0126924 | A1* | 5/2016 | Nakagawa | H03B 5/30 310/370 |
| 2017/0104401 | A1* | 4/2017 | Umehara | H02K 33/16 |
| 2017/0133918 | A1* | 5/2017 | Xu | H02K 33/16 |
| 2018/0166949 | A1* | 6/2018 | Hu | H02K 11/215 |
| 2019/0301869 | A1* | 10/2019 | Sasaki | G01C 19/5663 |
| 2019/0305637 | A1* | 10/2019 | Suzuki | B06B 1/045 |
| 2020/0044532 | A1* | 2/2020 | Zhang | H02K 33/16 |
| 2021/0218324 | A1 | 7/2021 | Hashimoto et al. | |
| 2022/0052594 | A1* | 2/2022 | Nakamura | H02K 33/16 |

FOREIGN PATENT DOCUMENTS

| | | | |
|---|---|---|---|
| JP | 2013-529133 | A | 7/2013 |
| JP | 2013-247810 | A | 12/2013 |
| JP | 2018-046487 | A | 3/2018 |
| JP | 2021109165 | A | 8/2021 |
| JP | 2021143580 | A | 9/2021 |

* cited by examiner

VIBRATION GENERATION DEVICE, VIBRATION REDUCTION DEVICE, AND ELECTRONIC APPARATUS

The present application is based on, and claims priority from JP Application Serial Number 2022-029122, filed Feb. 28, 2022, the disclosure of which is hereby incorporated by reference herein in its entirety.

BACKGROUND

1. Technical Field

The present disclosure relates to a vibration generation device, a vibration reduction device, and an electronic apparatus.

2. Related Art

In the related art, for example, as disclosed in JP-A-2021-109165, a vibration actuator that implements a vibration function of an electronic apparatus is known.

The vibration actuator disclosed in JP-A-2021-109165 includes a fixed body and a movable body that is supported by the fixed body to swing around a shaft portion provided at the fixed body. The movable body is movably supported by the fixed body via a magnetic spring implemented based on an attractive force of a magnet. The movable body includes a core that is a magnetic body and a coil that is wound around the core. Currents of different frequencies flow through the coil, and the movable body moves around the shaft portion which is inserted through a through hole of the core. A flexible substrate that supplies electric power to the coil is provided at one end portion of the core.

The fixed body is formed by combining a base plate and a case. The fixed body includes the magnet and a buffer portion. The magnet can move the movable body in cooperation with the coil of the movable body. A free end of the movable body that vibrates comes into contact with the buffer portion. Accordingly, vibration of the movable body can be transmitted to a housing of the vibration actuator, and the buffer portion can generate large vibration.

However, the vibration actuator disclosed in JP-A-2021-109165 has a problem in that it is difficult to adjust a magnitude of the generated vibration.

Specifically, in the vibration actuator, the coil wound around the movable body is attracted to or repelled with respect to the magnet fixed to the fixed body, and the movable body swings around the shaft portion, thereby generating the vibration. However, there is a problem that even when it is attempted to adjust a weight of the movable body to adjust the magnitude of the vibration generated by the vibration actuator, the weight of the movable body cannot be easily changed because the coil is wound around the movable body.

Therefore, there is a demand for a configuration capable of easily adjusting the magnitude of the generated vibration.

SUMMARY

A vibration generation device according to a first aspect of the present disclosure includes: a base configured to transmit vibration to an object; an arm provided at the base swingably around a rotation axis; and at least one driving unit including a magnet, and a coil disposed to face the magnet in a non-contact manner, and configured to swing the arm. One of the magnet and the coil is disposed at a position separated from the rotation axis at the arm. The arm includes a disposition portion provided at a position separated from the rotation axis at the arm, and a weight portion detachably attached to the disposition portion.

A vibration generation device according to a second aspect of the present disclosure includes: a base configured to transmit vibration to an object; an arm detachably attached to the base and swingable around a rotation axis; and at least one driving unit including a magnet, and a coil disposed to face the magnet in a non-contact manner, and configured to swing the arm. One of the magnet and the coil is disposed at a position separated from the rotation axis. The arm is selected from a plurality of types of arms that differ in rotational torque generated by swing of the arm, and is mounted to the base.

A vibration reduction device according to a third aspect of the present disclosure includes: the vibration generation device according to the first aspect of the second aspect; a detection unit configured to detect vibration; and an operation control unit configured to cause the vibration generation device to generate vibration opposite in phase from the vibration detected by the detection unit.

An electronic apparatus according to a fourth aspect of the present disclosure includes the vibration reduction device according to the third aspect.

DESCRIPTION OF EXEMPLARY EMBODIMENTS

First Embodiment

Hereinafter, a first embodiment according to the present disclosure will be described with reference to the drawings.

Schematic Configuration of Projector

Figure 1:
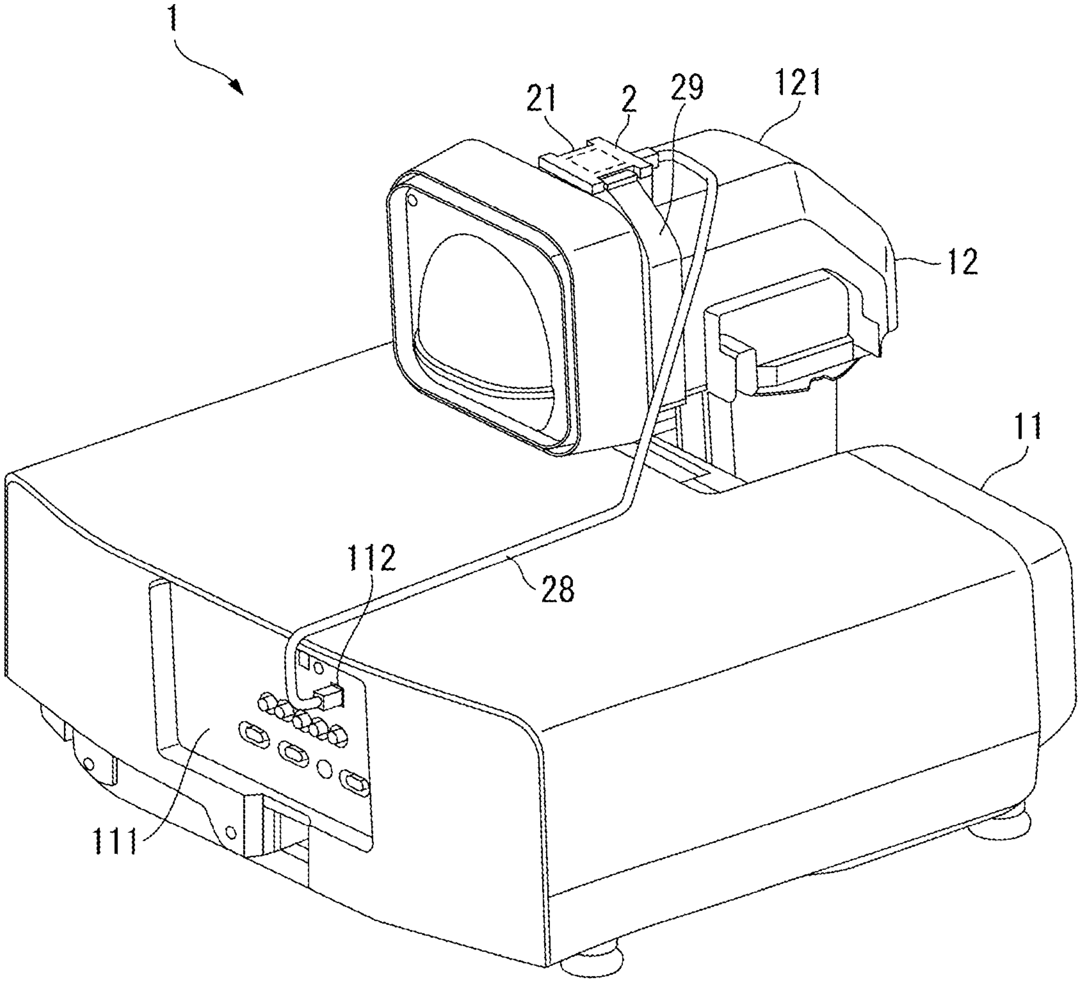
FIG. 1 is a perspective view showing a projector according to a first embodiment.

FIG. 1 is a perspective view showing a projector 1 according to the embodiment.

The projector 1 according to the embodiment is an electronic apparatus that modulates a light emitted from a light source to form an image light corresponding to image information, and enlarges and projects the formed image light onto a projection surface. As shown in FIG. 1, the projector 1 includes an exterior housing 11, a projection optical device 12, and a vibration reduction device 2. Although not shown, the projector 1 further includes the light source, a light modulation device, a power supply device, a cooling device, and a control device.

The light modulation device modulates the light emitted from the light source to form the image light corresponding to the image information.

The power supply device supplies electric power to electronic components of the projector 1.

The cooling device cools cooling target provided inside the projector 1.

The control device controls operations of the projector 1.

Configuration of Exterior Housing

The exterior housing 11 constitutes an exterior of the projector 1, and houses the light source, the light modulation device, the power supply device, the cooling device, and the control device described above therein. The exterior housing 11 is formed in a substantially rectangular parallelepiped shape.

The exterior housing 11 includes a coupling terminal 112 to which a cable 28 of the vibration reduction device 2 to be described later is coupled in a surface 111 in a projection direction of an image projected by the projection optical device 12. The coupling terminal 112 is, for example, a universal serial bus (USB) terminal, and is used to supply the electric power to the vibration reduction device 2.

Configuration of Projection Optical Device

The projection optical device 12 projects the image light formed by the light modulation device described above onto the projection surface. In the embodiment, the projection optical device 12 is detachably attached to the exterior housing 11. That is, the projection optical device 12 is replaceable.

The projection optical device 12 shown in FIG. 1 sequentially bends a traveling direction of the image light incident on the projection optical device 12 in two stages, and projects the image light in a direction opposite from an incident direction of the image light in the projection optical device 12. That is, the projection optical device 12 has a substantially U-shape rotated by 90° counterclockwise when viewed from a direction orthogonal to a direction coupling the surface 111 in the projection direction and a surface on a side opposite from the surface 111 in the projection direction.

The projection optical device 12 includes a lens barrel 121, and further includes a plurality of lenses and a plurality of reflection members (not shown) provided in the lens barrel 121.

Configuration of Vibration Reduction Device

The vibration reduction device 2 is attached to a vibration reduction target, and reduces vibration of the vibration reduction target by generating vibration opposite in phase from the vibration acting on the vibration reduction target. In the embodiment, the vibration reduction device 2 is provided at the lens barrel 121 and reduces vibration acting on the lens barrel 121.

Here, when the vibration is propagated to the projector 1 from an outside, or when the vibration is generated due to an internal factor such as a fan of the projector 1, the projection optical device 12 provided to protrude to an outside of the exterior housing 11 is more likely to greatly vibrate than the exterior housing 11. In this way, when the projection optical device 12 vibrates, the image projected onto the projection surface by the projection optical device 12 shakes greatly.

From such a problem, in the embodiment, by providing the vibration reduction device 2 at the projection optical device 12, the vibration of the projection optical device 12 is reduced, and therefore the shaking of the image is restricted.

Hereinafter, a configuration of the vibration reduction device 2 will be described in detail.

The vibration reduction device 2 includes a device main body 21, the cable 28, and a fixture 29.

The cable 28 extends from the device main body 21. The cable 28 is coupled to the coupling terminal 112, and supplies the electric power supplied from the coupling terminal 112 to the device main body 21.

The fixture 29 fixes the device main body 21 to the vibration reduction target. In the embodiment, the fixture 29 is implemented by a belt, and is wound around an outer peripheral surface of the lens barrel 121 provided in the projection optical device 12 which is the vibration reduction target. However, the fixture 29 is not limited thereto, and may be a fastening member such as a screw as long as the fixture 29 can fix a housing 22 to the vibration reduction target.

Figure 2:
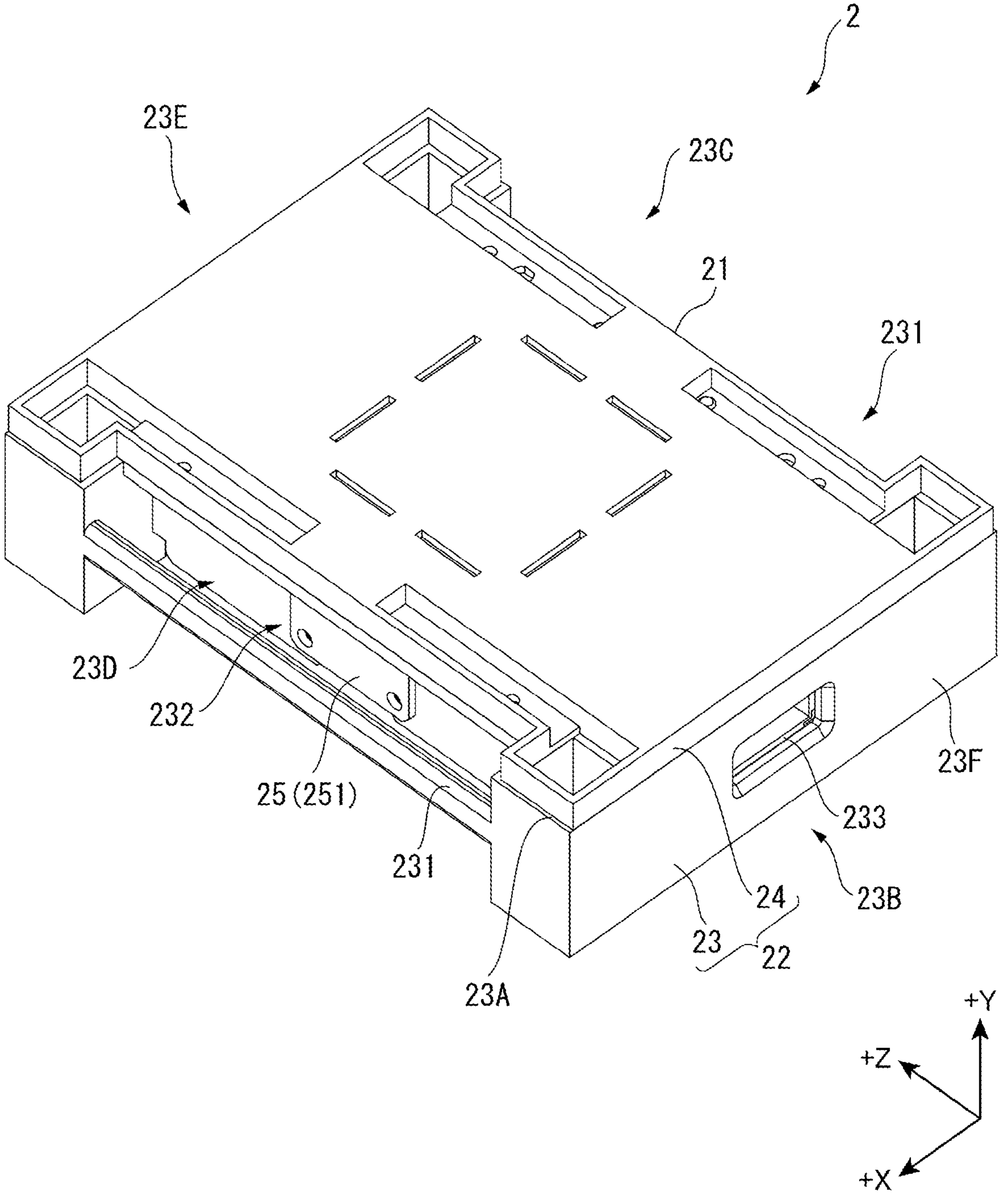
FIG. 2 is a perspective view showing a device main body of a vibration reduction device according to the first embodiment.
Figure 3:
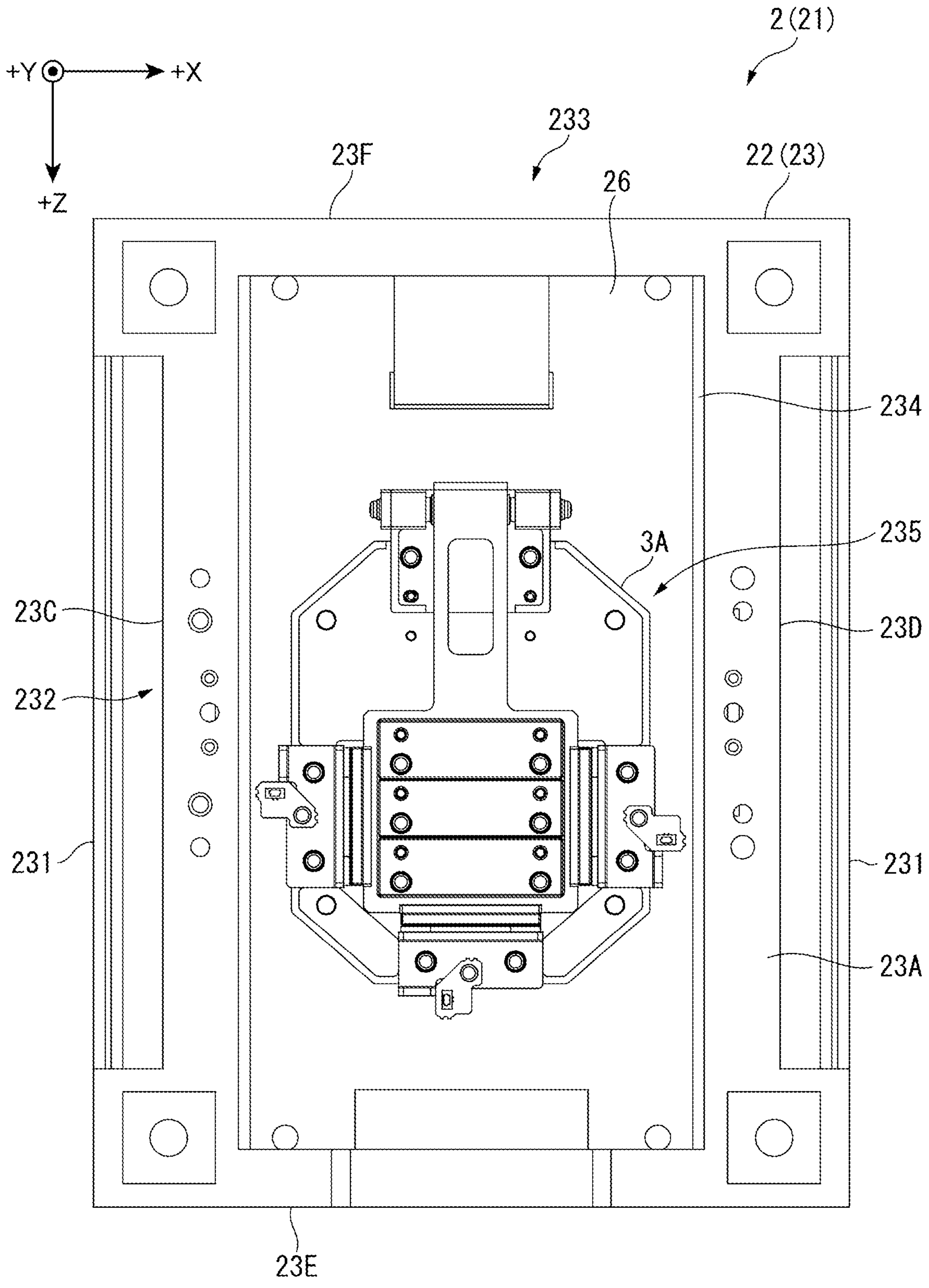
FIG. 3 is a plan view showing the device main body from which a lid member is removed according to the first embodiment.

FIG. 2 is a perspective view showing the device main body 21, and FIG. 3 is a plan view showing the device main body 21 in a state where a lid member 24 is removed.

The device main body 21 generates vibration opposite in phase from the vibration of the lens barrel 121 to reduce the vibration of the lens barrel 121. The device main body 21 includes the housing 22 and a detection unit 25 as shown in FIG. 2, and further includes an operation control unit 26 and a vibration generation device 3A as shown in FIG. 3.

The housing 22 houses the detection unit 25, the operation control unit 26, and the vibration generation device 3A. As shown in FIG. 2, the housing 22 includes a frame 23 and the lid member 24, and is formed in a substantially rectangular parallelepiped shape by combining the frame 23 and the lid member 24.

The lid member 24 is formed in a rectangular plate shape, and is detachably attached to a first surface 23A of the frame 23.

As shown in FIGS. 2 and 3, the frame 23 is formed in a rectangular frame shape having the first surface 23A, a second surface 23B, a third surface 23C, a fourth surface 23D, a fifth surface 23E, and a sixth surface 23F. The first surface 23A and the second surface 23B are opposite-side surfaces. The third surface 23C and the fourth surface 23D are opposite-side surfaces, and the fifth surface 23E and the sixth surface 23F are opposite-side surfaces.

As shown in FIG. 2, the frame 23 includes fixture attachment portions 231, a sensor attachment portion 232, and a terminal portion 233.

As shown in FIG. 2, the fixture attachment portions 231 are rod-shaped portions provided in a portion of the frame 23 on the third surface 23C side and a portion of the frame 23 on the fourth surface 23D side. End portions of the fixture 29 are attached to the fixture attachment portions 231.

The sensor attachment portion 232 is disposed between the third surface 23C and the fourth surface 23D. The detection unit 25 is attached to the sensor attachment portion 232.

The terminal portion 233 is provided substantially at a center of the sixth surface 23F. The cable 28 is coupled to the terminal portion 233, and the electric power is supplied from the coupling terminal 112 via the cable 28.

The detection unit 25 detects the vibration acting on the vibration reduction device 2. The detection unit 25 includes a printed circuit board 251 and a sensor (not shown) provided at the printed circuit board 251. The printed circuit board 251 is attached to the sensor attachment portion 232, and outputs a direction and an amplitude of the vibration detected by the sensor to the operation control unit 26. Examples of the sensor provided in the detection unit 25 include an acceleration sensor and a gyro sensor.

As shown in FIG. 3, the frame 23 further includes a disposition portion 234 and an attachment portion 235.

The disposition portion 234 and the attachment portion 235 are covered with the lid member 24 attached to the first surface 23A. In other words, the disposition portion 234 and the attachment portion 235 are exposed when the lid member 24 is removed from the frame 23.

The operation control unit 26 is disposed in the disposition portion 234.

The vibration generation device 3A is attached to the attachment portion 235.

The operation control unit 26 is a printed circuit board at which a plurality of circuit elements are mounted, and is disposed in the disposition portion 234. The operation control unit 26 controls operations of the vibration reduction device 2. Specifically, the operation control unit 26 operates the vibration generation device 3A based on a detection result obtained by the detection unit 25. Specifically, the operation control unit 26 supplies driving power to the vibration generation device 3A, and operates the vibration generation device 3A to generate the vibration opposite in phase from the vibration detected by the detection unit 25.

Configuration of Vibration Generation Device

Figure 4:
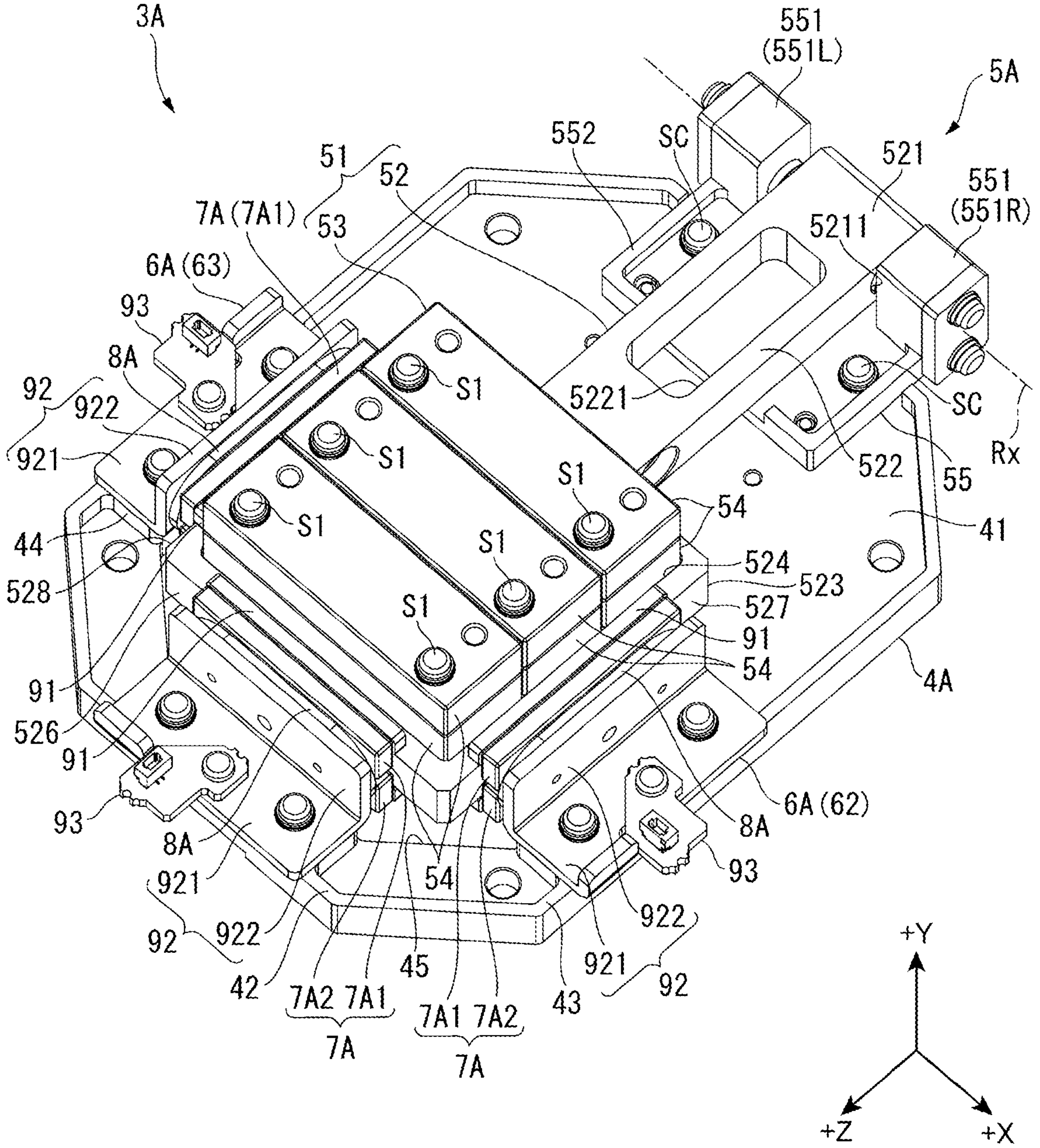
FIG. 4 is a perspective view showing a vibration generation device according to the first embodiment.
Figure 5:
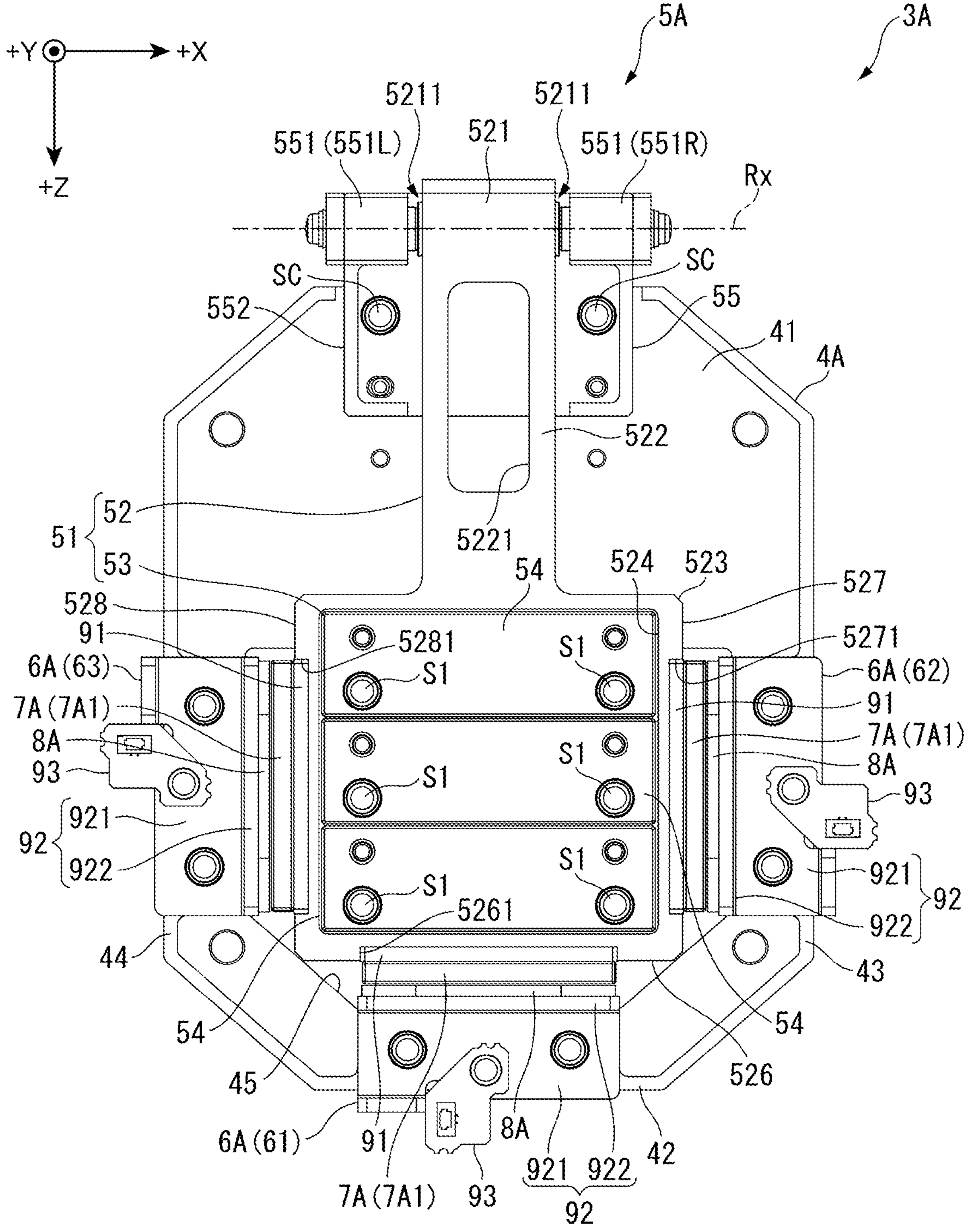
FIG. 5 is a plan view showing the vibration generation device according to the first embodiment.

FIG. 4 is a perspective view showing the vibration generation device 3A, and FIG. 5 is a plan view showing the vibration generation device 3A.

The vibration generation device 3A is attached to the attachment portion 235 provided in the frame 23. The vibration generation device 3A generates the vibration for reducing the vibration of the lens barrel 121, which is a vibration reduction object, under the control of the operation control unit 26. As shown in FIGS. 4 and 5, the vibration generation device 3A includes a base 4A, a pendulum 5A, and at least one driving unit 6A.

In the following description, three directions orthogonal to one another are defined as a +X direction, a +Y direction, and a +Z direction. The +X direction is a direction along a rotation axis Rx of the pendulum 5A, and is a direction from the third surface 23C toward the fourth surface 23D described above. The +Y direction is a direction perpendicular to the base 4A, and is a direction from the second surface 23B toward the first surface 23A described above. The +Z direction is a direction in which the pendulum 5A extends from the rotation axis Rx when viewed from the +Y direction, and is a direction from the sixth surface 23F toward the fifth surface 23E described above. Further, although not shown, a direction opposite from the +X direction is defined as a −X direction, a direction opposite from the +Y direction is defined as the −Y direction, and a direction opposite from the +Z direction is defined as a −Z direction.

Configuration of Base

The base 4A is a plate-shaped member formed in a flat plate shape. The base 4A transmits the vibration generated by the vibration generation device 3A to an object in which the base 4A is provided, that is, the frame 23. The base 4A supports the pendulum 5A and the driving unit 6A, and is attached to the attachment portion 235 shown in FIG. 3. The base 4A includes an attachment portion 41, fixing portions 42 to 44, and a relief portion 45.

The attachment portion 41 is a portion of the base 4A to which the pendulum 5A is attached. The attachment portion 41 is disposed at an end portion of the base 4A in the −Z direction, and a rotation axis portion 55 forming the rotation axis Rx of the pendulum 5A is attached to the attachment portion 41.

As shown in FIGS. 4 and 5, each of the fixing portions 42 to 44 is a portion of the base 4A to which a holding member 92 of the driving unit 6A can be fixed. The fixing portion 42 is provided at an end portion of the base 4A in the +Z direction. The fixing portion 43 is provided at an end portion of the base 4A in the +X direction, and the fixing portion 44 is provided at an end portion of the base 4A in the −X direction.

That is, the fixing portion 43 is a portion extending direction, which is an extending direction of the pendulum 5A from the rotation axis Rx, from an end portion of the attachment portion 41 in the +X direction along the rotation axis Rx. The fixing portion 44 is a portion extending in the +Z direction, which is the extending direction of the pendulum 5A from the rotation axis Rx, from an end portion of the attachment portion 41 in the −X direction along the rotation axis Rx. The fixing portion 42 is a portion for coupling opposite-side end portions of the fixing portions 43 and 44 from the attachment portion 41.

The relief portion 45 is provided between the attachment portion 41 and the fixing portion 42 in the +Z direction. Specifically, the relief portion 45 is provided in a portion surrounded by the attachment portion 41 and the fixing portions 42 to 44. The relief portion 45 is a portion for preventing a portion of the pendulum 5A in the +Z direction and a magnet 7A to be described later from coming into contact with the base 4A when the pendulum 5A swings around the rotation axis Rx. In the embodiment, the relief portion 45 is an opening penetrating the base 4A along the +Y direction. However, the relief portion 45 is not limited thereto, and may be a recess that opens in a direction opposite from a direction facing the pendulum 5A. Specifically, the relief portion 45 may be a recess that opens in the +Y direction or the −Y direction. Even when the relief portion 45 is the recess, the relief portion 45 can be configured such that the portion of the pendulum 5A in the +Z direction and the magnet 7A do not come into contact with the base 4A.

Configuration of Pendulum

Figure 6:
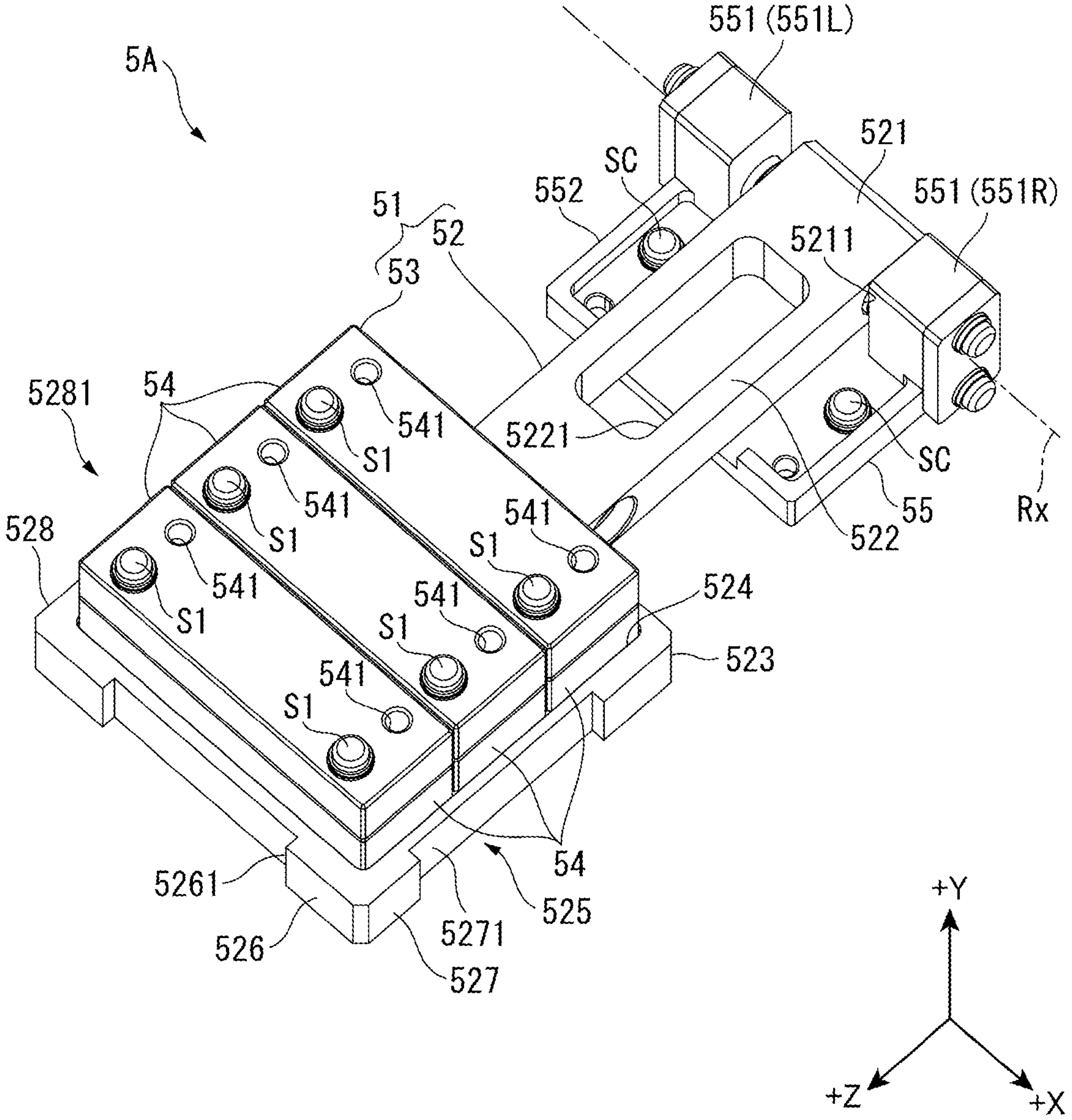
FIG. 6 is a perspective view showing a pendulum according to the first embodiment.
Figure 7:
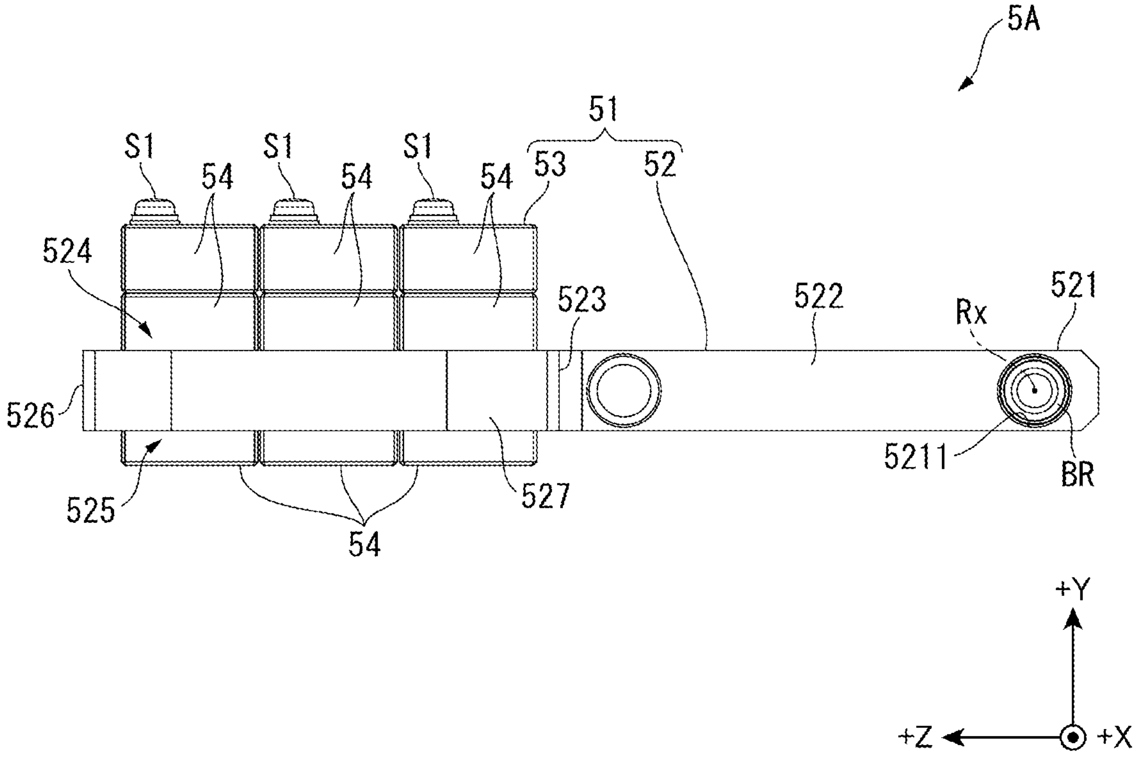
FIG. 7 is a side view showing an arm according to the first embodiment.

FIG. 6 is a perspective view showing the pendulum FIG. 7 is a side view of an arm 51 as viewed from the 5A. +X direction.

The pendulum 5A is supported by the base 4A swingably around the rotation axis Rx, and extends in the +Z direction from the rotation axis Rx. The pendulum 5A is swung around the rotation axis Rx by the driving unit 6A, and thus generates vibration. As shown in FIGS. 4 to 7, the pendulum 5A includes the arm 51 and a rotation axis portion 55.

Configuration of Rotation Axis Portion

Figure 8:
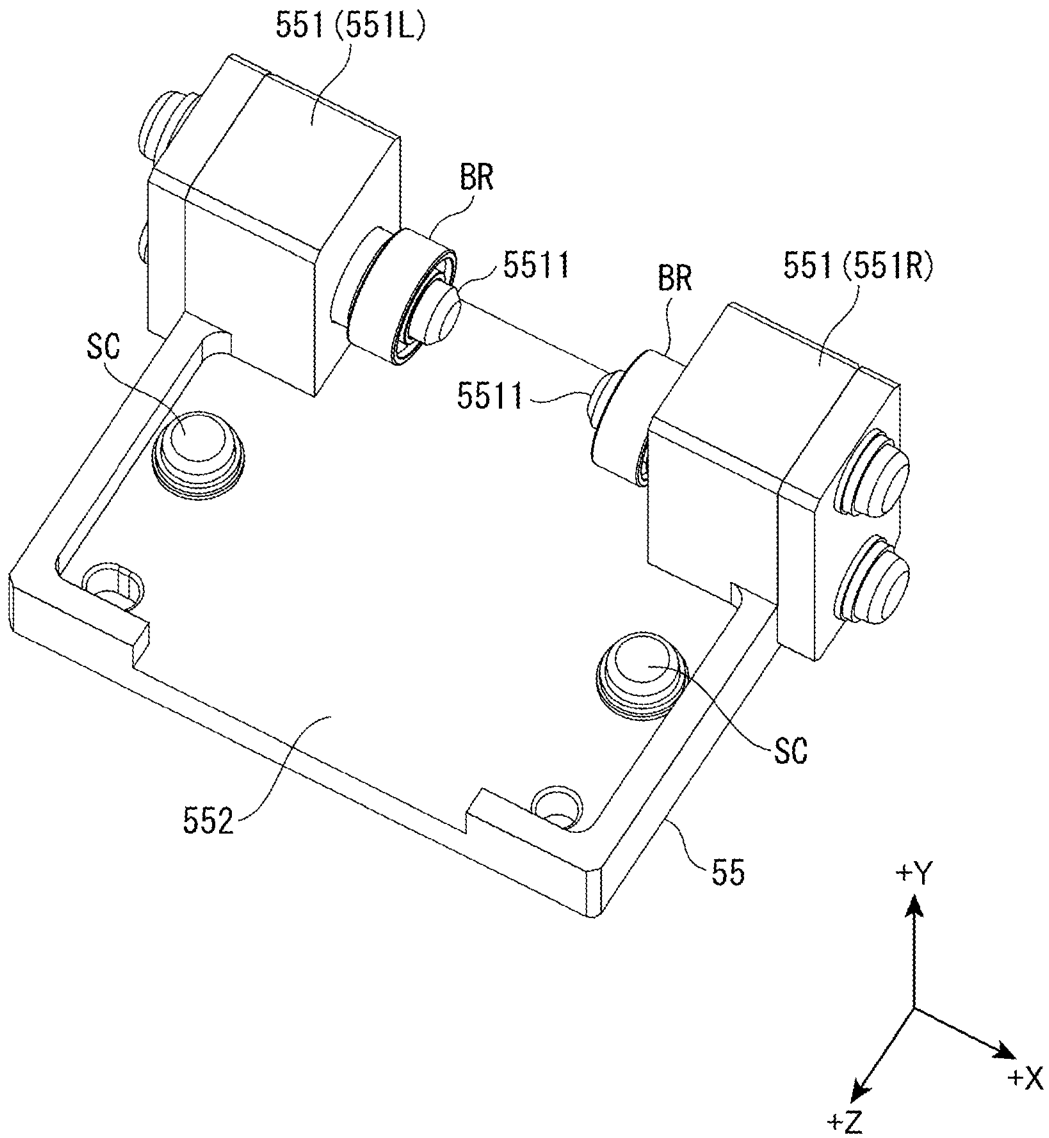
FIG. 8 is a perspective view showing a rotation axis portion according to the first embodiment.

FIG. 8 is a perspective view showing the rotation axis portion 55.

First, the rotation axis portion 55 will be described.

The rotation axis portion 55 rotatably supports an end portion of the arm 51 in the −Z direction, and is attached to the attachment portion 41 of the base 4A. The rotation axis portion 55 includes a pair of support portions 551 and a mounting portion 552.

The pair of support portions 551 are provided at positions sandwiching the arm 51 in the +X direction, and support the arm 51 rotatably around the rotation axis Rx. As shown in FIG. 8, each of the pair of support portions 551 includes a pin 5511 that forms the rotation axis Rx of the pendulum 5A. Of the pair of support portions 551, the pin 5511 in a support portion 551L disposed in the −X direction protrudes from the support portion 551L in the +X direction, and the pin 5511 in a support portion 551R disposed in the +X direction protrudes from the support portion 551R in the −X direction. The pins 5511 are inserted into the arm 51. Accordingly, the arm 51 is supported rotatably around the rotation axis Rx along the +X direction. The pair of support portions 551 are provided at an end portion of the mounting portion 552 in the −Z direction.

The mounting portion 552 is detachably attached to the attachment portion 41 by screws SC.

Therefore, the arm 51, hence the pendulum 5A can be detached from the base 4A by detaching the mounting portion 552 from the attachment portion 41.

Configuration of Arm

The arm 51 is provided rotatably around the rotation axis Rx by the rotation axis portion 55 attached to the base 4A. As shown in FIGS. 6 and 7, the arm 51 includes an arm main body 52 and a weight portion 53 attached to the arm main body 52.

As shown in FIG. 6, when viewed from the +Y direction, the arm main body 52 has a substantially T-shape in which an end portion of the arm main body 52 in the +Z direction is larger than an end portion of the arm main body 52 in the −Z direction. As shown in FIGS. 6 and 7, the arm main body 52 includes a coupling portion 521, an extending portion 522, an enlarged portion 523, disposition portions 524 and 525, a first side surface portion 526, a second side surface portion 527, and a third side surface portion 528.

The coupling portion 521 is a portion of the arm main body 52 supported by the pair of support portions 551. In the embodiment, the coupling portion 521 is provided at an end portion of the arm main body 52 in the −Z direction. A hole portion 5211 is provided in each of a surface of the coupling portion 521 facing the +X direction and a surface of the coupling portion 521 facing the −X direction. A bearing BR shown in FIG. 7 is disposed inside each hole portion 5211. The pin 5511 of each rotation axis portion 55 is inserted into the bearing BR via a washer (not shown), and thus the arm 51 is supported by the rotation axis portion 55 attached to the base 4A.

The extending portion 522 is an extending portion from the coupling portion 521 to the enlarged portion 523. A dimension of the extending portion 522 along the +X direction is smaller than a dimension of the enlarged portion 523 along the +X direction, and the dimension of the extending portion 522 along the +X direction is constant in a range from the coupling portion 521 to the enlarged portion 523. The extending portion 522 is provided with a through hole 5221 to reduce a weight of the arm 51 and to locate a position of a center of gravity of the arm 51 further toward the +Z direction. However, the through hole 5221 is not limited thereto. A recess may be provided instead of the through hole 5221, or the through hole 5221 may not be provided.

The enlarged portion 523 is a portion of the arm main body 52 in the +Z direction. The dimension of the enlarged portion 523 along the +X direction is larger than a dimension of the coupling portion 521 along the +X direction. The center of gravity of the arm 51 including the enlarged portion 523 is located closer to the +Z direction than is an intermediate position between the rotation axis Rx and an end portion of the arm 51 in the +Z direction. That is, regardless of a configuration and disposition of the weight portion 53, the center of gravity of the arm 51 is located closer to a first side surface portion 526 side than is an intermediate position between the rotation axis Rx and the end portion of the arm 51 on the first side surface portion 526 side.

Figure 9:
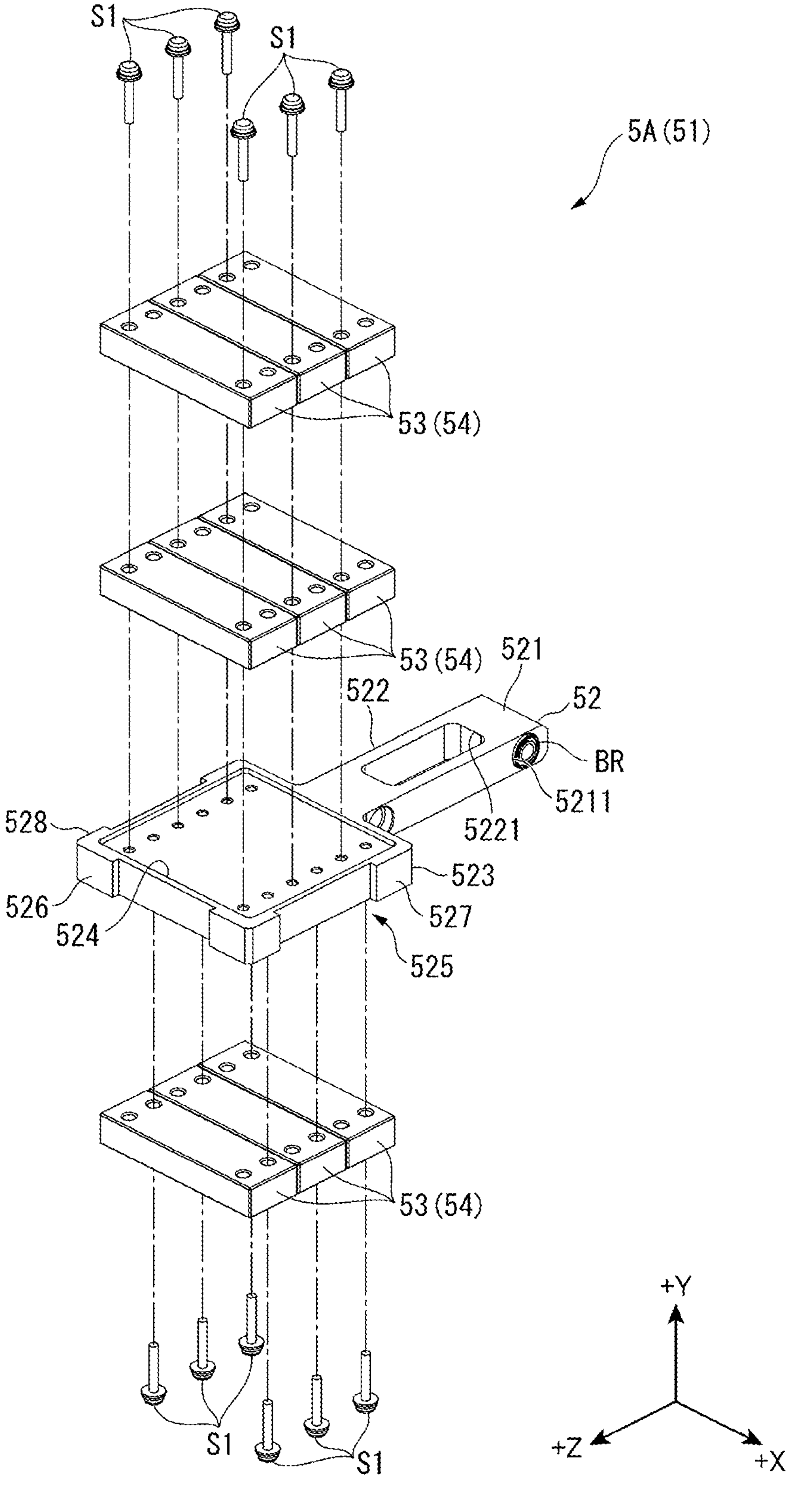
FIG. 9 is an exploded perspective view showing the arm according to the first embodiment.
Figure 10:
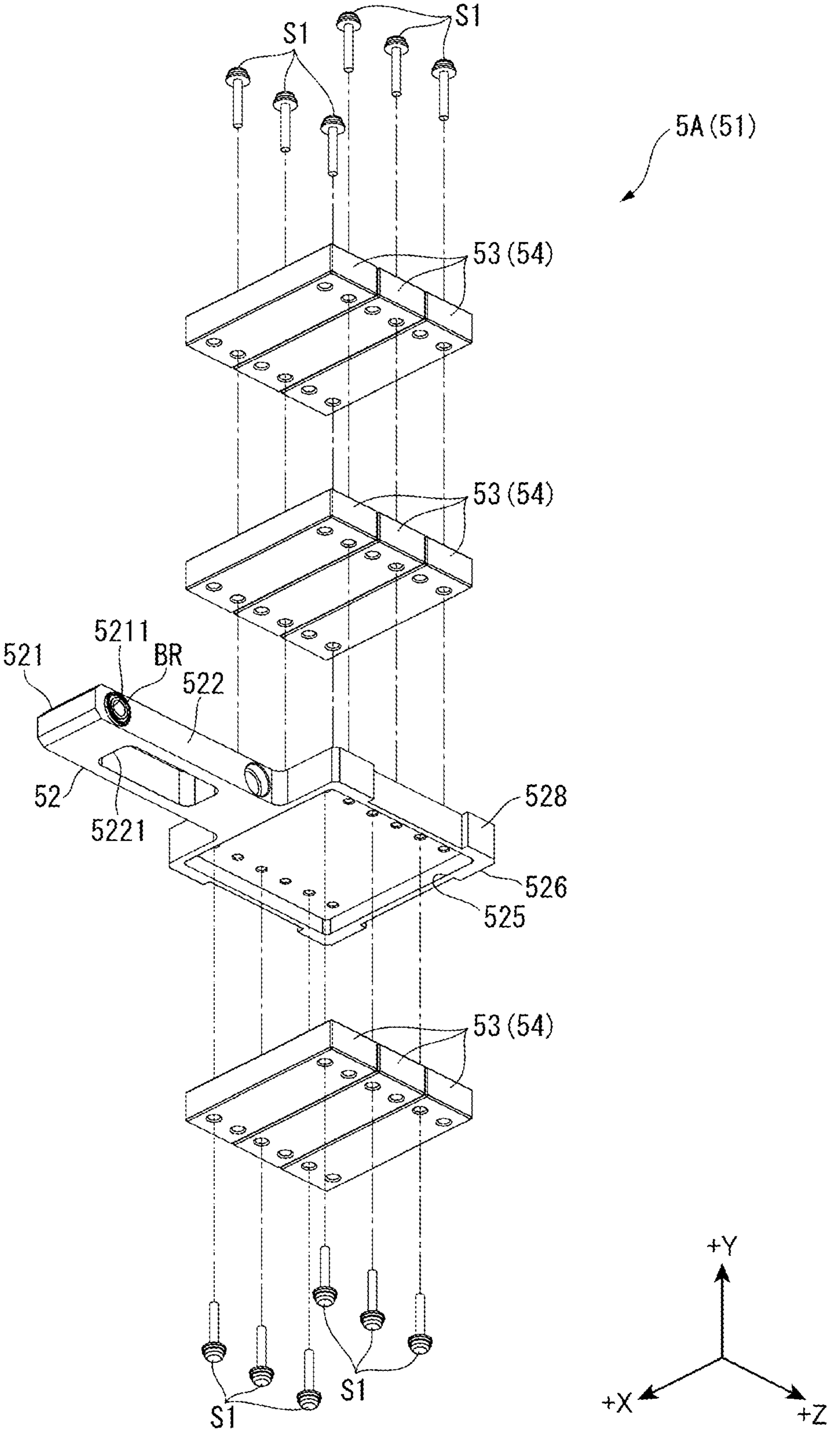
FIG. 10 is an exploded perspective view showing the arm according to the first embodiment.

FIGS. 9 and 10 are exploded perspective views showing the arm 51. Specifically, FIG. 9 is the exploded perspective view showing the arm 51 viewed from the +Y direction, and FIG. 10 is the exploded perspective view showing the arm 51 viewed from the −Y direction.

As shown in FIG. 9, the disposition portion 524 is provided at a surface of the enlarged portion 523 in the +Y direction. Specifically, the disposition portion 524 is a recess recessed in the −Y direction from the surface of the enlarged portion 523 in the +Y direction, and is formed in a substantially square shape when viewed from the +Y direction.

As shown in FIG. 10, the disposition portion 525 is provided at a surface of the enlarged portion 523 in the −Y direction. Specifically, the disposition portion 525 is a recess recessed in the +Y direction from the surface of the enlarged portion 523 in the −Y direction, and is formed in a substantially square shape when viewed from the −Y direction.

As shown in FIGS. 6, 7, 9, and 10, the weight portion 53 is disposed at at least one of the disposition portions 524 and 525. That is, the disposition portions 524 and 525 are provided at positions separated from the rotation axis Rx to the first side surface portion 526 side, and are portions where the weight portions 53 can be disposed.

The weight portion 53 includes at least one weight portion member 54. That is, a weight and a position of a center of gravity of the weight portion 53 are adjusted according to the number and disposition of the weight portion members 54 constituting the weight portion 53.

The weight portion member 54 is disposed along the rotation axis Rx at one of the disposition portions 524 and 525. The weight portion member 54 has through holes 541 penetrating the weight portion member 54 along the +Y direction. The weight portion member 54 is fixed to one of the disposition portions 524 and 525 by screws S1 inserted through the through holes 541.

Three weight portion members 54 can be disposed along the +Z direction orthogonal to the rotation axis Rx when viewed from a position facing the disposition portion 524, and the weight portion member 54 can be further disposed in the +Y direction with respect to the weight portion member 54 disposed at the disposition portion 524. That is, the weight portion member 54 can be disposed at the disposition portions 524 and 525 in a stacked way. Specifically, the weight portion member 54 is formed in a substantially rectangular parallelepiped shape having a longitudinal axis along the +X direction. When a plurality of weight portion members 54 are disposed to overlap with one another at the disposition portion 524 in the +Y direction, the screws S1 are fixed to the disposition portion 524 in a state of being inserted through the through holes 541 of each weight portion member 54. The same applies to the disposition portion 525. With such a configuration, the number and disposition of the weight portion members 54 provided at the arm 51 can be adjusted, and the weight and the position of the center of gravity of the arm 51 provided with the weight portion 53 can be adjusted.

As shown in FIGS. 7 to 10, the first side surface portion 526 is an end portion on an opposite side of a center of the arm 51 from the rotation axis Rx in the +Z direction, which is the extending direction of the arm 51, among directions intersecting with the rotation axis Rx. That is, the first side surface portion 526 is a tip end portion of the arm 51 facing the +Z direction in the arm 51 extending in the +Z direction from the rotation axis Rx, and is a free end of the arm 51. The first side surface portion 526 includes an attachment portion 5261 recessed in the −Z direction. A plate member 91 constituting a first driving unit 61 is attached to the attachment portion 5261.

The second side surface portion 527 and the third side surface portion 528 intersect with the +X direction, which is a direction parallel to the rotation axis Rx, and are opposite-side end portions. That is, the second side surface portion 527 and the third side surface portion 528 are side surface portions of the enlarged portion 523 in the +X direction and the −X direction. Specifically, the second side surface portion 527 is the side surface portion of the enlarged portion 523 facing the +X direction, and the third side surface portion 528 is the side surface portion of the enlarged portion 523 facing the −X direction. The second side surface portion 527 includes an attachment portion 5271 recessed in the −X direction. The plate member 91 of a second driving unit 62 is attached to the attachment portion 5271.

The third side surface portion 528 includes an attachment portion 5281 recessed in the +X direction. The plate member 91 of a third driving unit 63 is attached to the attachment portion 5281.

Configuration of Driving Unit

Figure 11:
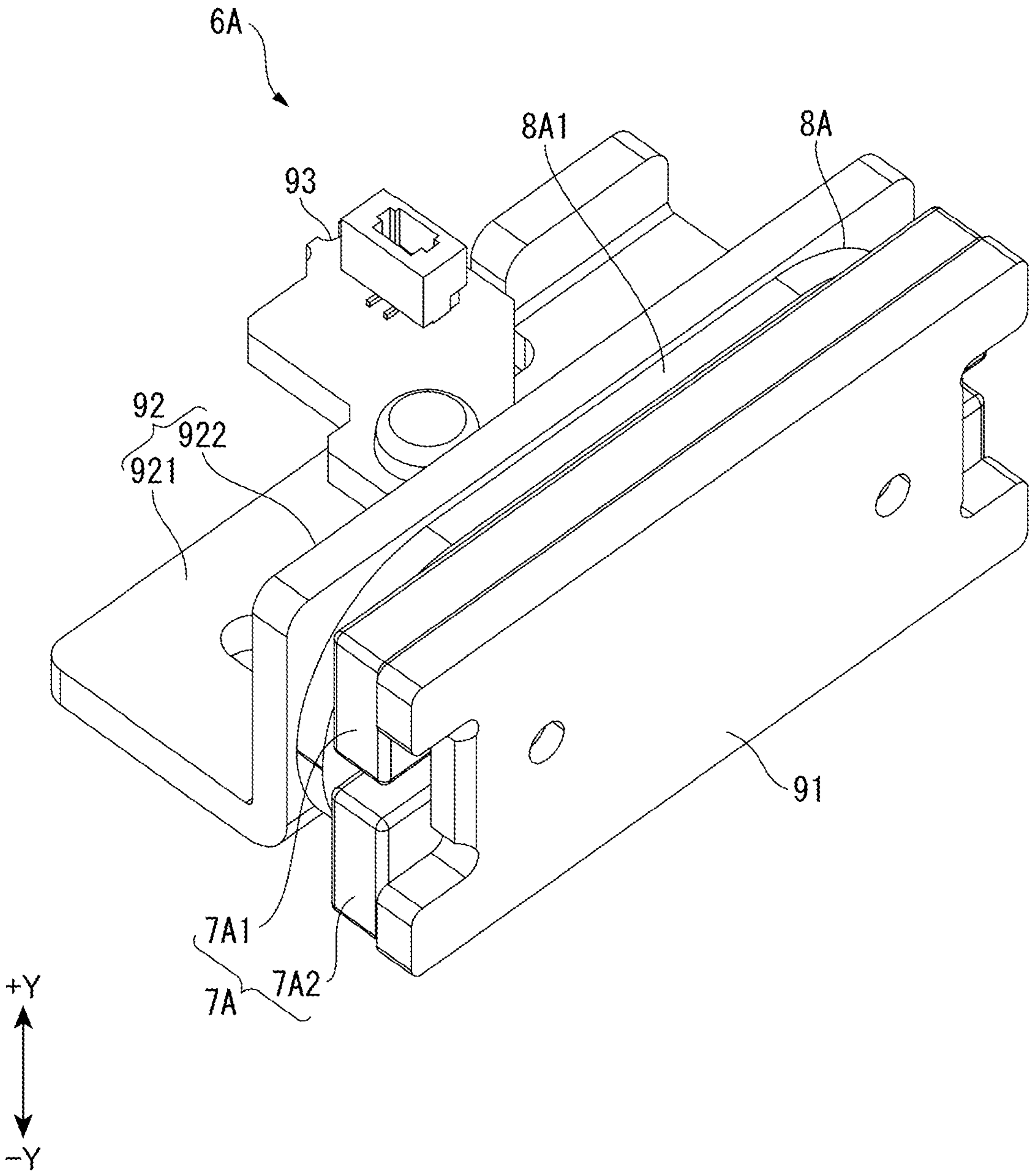
FIG. 11 is a perspective view showing a driving unit according to the first embodiment.
Figure 12:
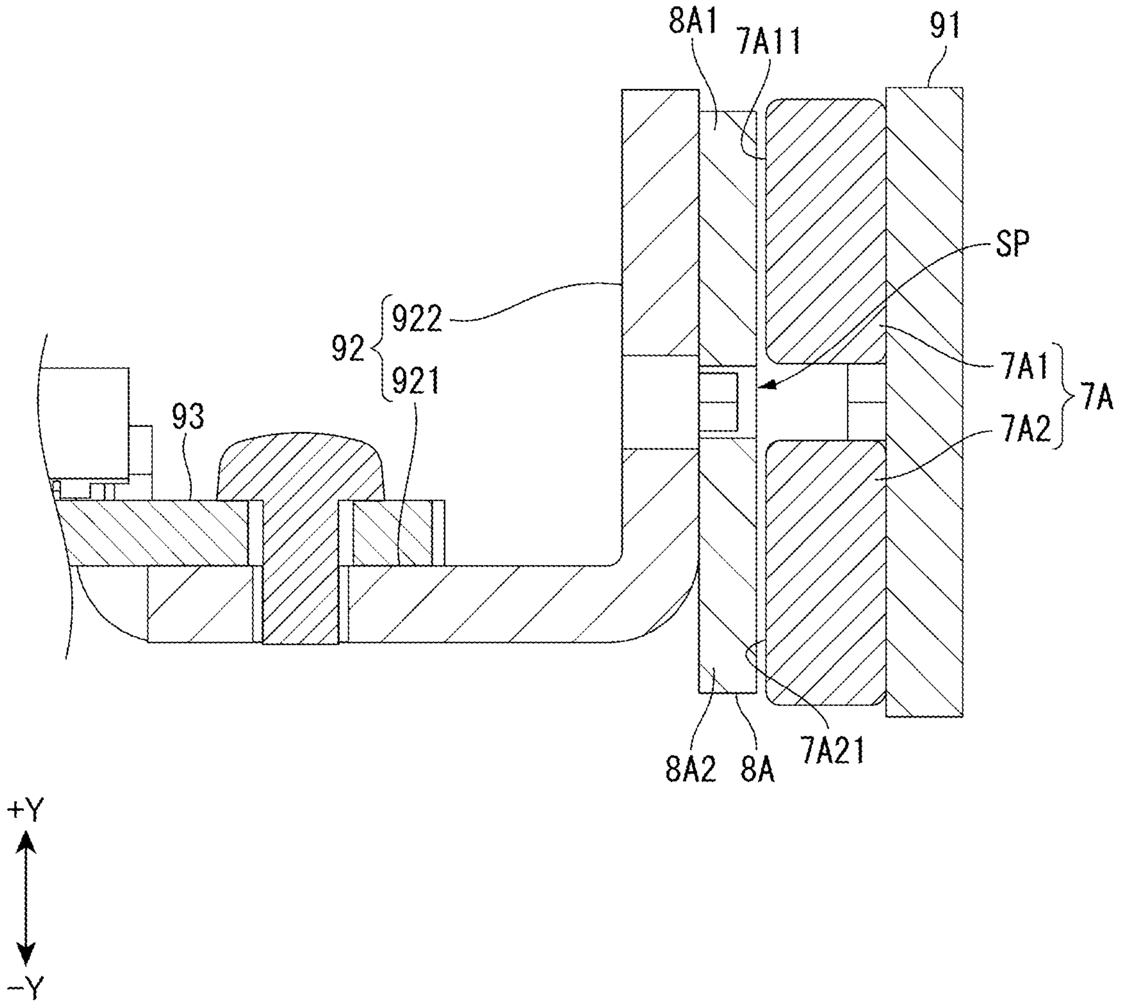
FIG. 12 is a cross-sectional view showing the driving unit according to the first embodiment.

FIG. 11 is a perspective view showing the driving unit 6A, and FIG. 12 is a cross-sectional view showing the driving unit 6A.

The driving unit 6A swings the arm 51 of the pendulum 5A supported by the base 4A around the rotation axis Rx. At least one driving unit 6A is provided in the vibration generation device 3A. In other words, the vibration generation device 3A includes at least one driving unit 6A.

As shown in FIGS. 11 and 12, the driving unit 6A includes the magnet 7A, a coil 8A, the plate member 91, the holding member 92, and a terminal portion 93. The driving unit 6A further includes a control unit (not shown).

Configuration of Magnet

The magnet 7A is provided at a position separated from the rotation axis Rx at the arm 51 by the plate member 91. The magnet 7A is attracted or repelled with respect to a magnetic force generated in the coil 8A, thereby swinging the arm 51 around the rotation axis Rx. The magnet 7A includes a first magnet member 7A1 and a second magnet member 7A2.

Each of the first magnet member 7A1 and the second magnet member 7A2 is formed in a substantially rectangular parallelepiped shape having a longitudinal axis. A dimension of the first magnet member 7A1 along the longitudinal axis and a dimension of the second magnet member 7A2 along the longitudinal axis substantially coincide with a dimension of the coil 8A along the same direction.

As shown in FIG. 12, a surface 7A11 of the first magnet member 7A1 facing the coil 8A faces a first extending portion 8A1 of the coil 8A, which will be described later. A magnetic pole of the surface 7A11 is an S pole in the embodiment.

The second magnet member 7A2 is disposed to be separated from the first magnet member 7A1 in the −Y direction. Specifically, the second magnet member 7A2 is separated from the first magnet member 7A1 in the −Y direction from the first extending portion 8A1 toward a to-be-described second extending portion 8A2 in the coil 8A.

As shown in FIG. 12, a surface 7A21 of the second magnet member 7A2 facing the coil 8A faces the second extending portion 8A2 of the coil 8A. A magnetic pole of the surface 7A21 is an N pole in the embodiment. That is, the magnetic pole of the surface 7A11 of the first magnet member 7A1 facing the first extending portion 8A1 is different from the magnetic pole of the surface 7A21 of the second magnet member 7A2 facing the second extending portion 8A2.

Configuration of Plate Member

The plate member 91 is formed in a flat plate shape. The plate member 91 supports the magnet 7A and is attached to the arm 51 of the pendulum 5A. Accordingly, the magnet 7A is attached to the pendulum 5A. The plate member 91 functions as a yoke for the magnet 7A. That is, the plate member 91 is a magnet-side yoke provided at an opposite-side position of the magnet 7A from the coil 8A.

Configuration of Coil

Figure 13:
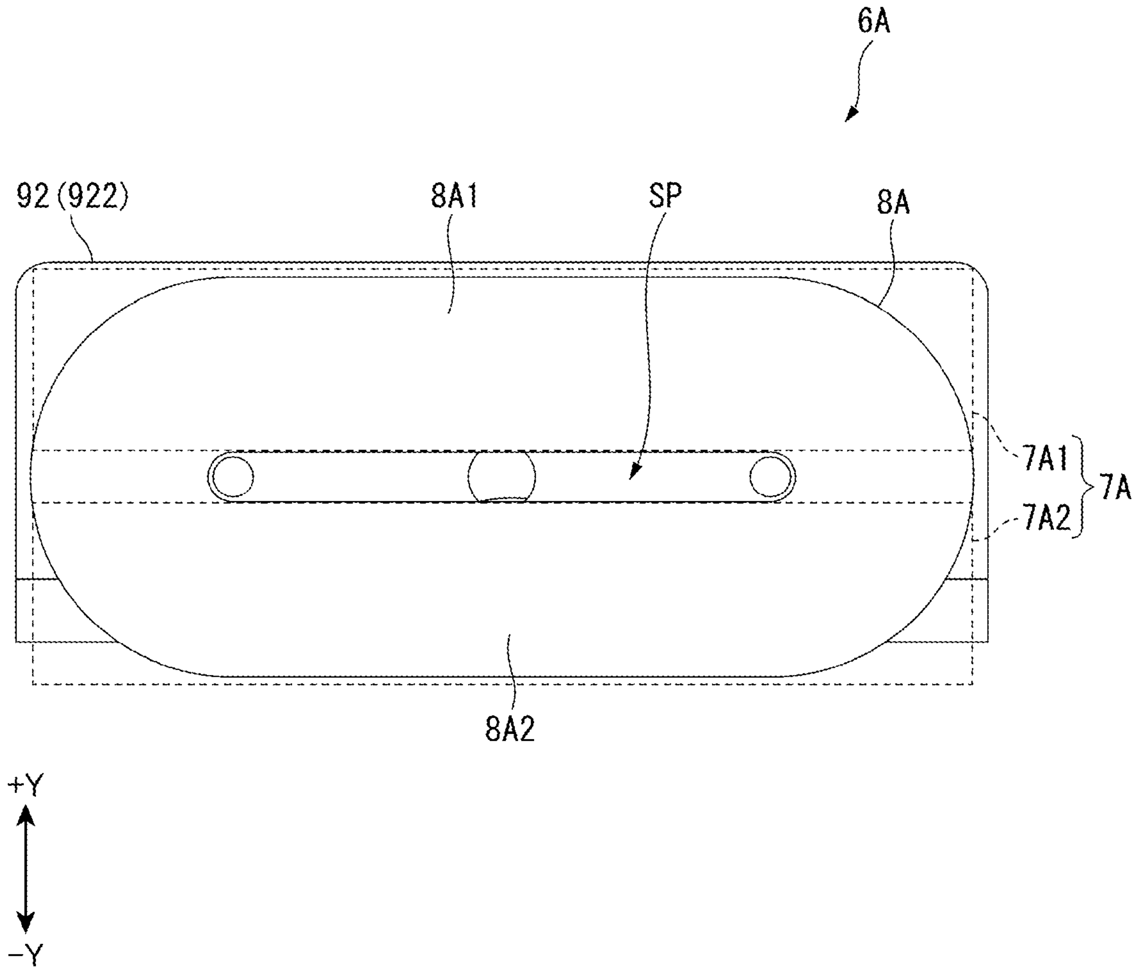
FIG. 13 is a view showing a coil according to the first embodiment.

FIG. 13 is a view showing the coil 8A constituting the driving unit 6A.

The coil 8A is provided at a configuration other than the pendulum 5A. In the embodiment, the coil 8A is fixed to the base 4A by the holding member 92. The coil 8A is disposed to face the magnet 7A in a non-contact manner, and generates a magnetic field acting on the magnet 7A.

As shown in FIG. 13, the coil 8A is an air-core coil formed by winding a conductive wire in a planar manner in a track shape or an oval shape having a longitudinal axis when viewed from the magnet 7A. Therefore, when viewed from the magnet 7A, a dimension of the coil 8A along the longitudinal axis is larger than a dimension of the coil 8A along a transverse axis orthogonal to the longitudinal axis.

The coil 8A includes the first extending portion 8A1 and the second extending portion 8A2.

The first extending portion 8A1 is a portion linearly extending along the longitudinal axis of the coil 8A. The first extending portion 8A1 is disposed in the +Y direction with respect to an air-core portion SP of the coil 8A.

The second extending portion 8A2 is disposed on a side opposite from the first extending portion 8A1 with the air-core portion SP of the coil 8A sandwiched therebetween. That is, the second extending portion 8A2 is disposed in the −Y direction with respect to the first extending portion 8A1. The second extending portion 8A2 linearly extends along the longitudinal axis of the coil 8A. A dimension of the second extending portion 8A2 along the longitudinal axis of the coil 8A is substantially the same as a dimension of the first extending portion 8A1 along the longitudinal axis of the coil 8A. When the control unit causes the current to flow through the coil 8A, a direction of the current in the second extending portion 8A2 is opposite from a direction of the current in the first extending portion 8A1.

In the embodiment, the coil 8A is the air-core coil having no core as described above, and may be a coil having a core between the first extending portion 8A1 and the second extending portion 8A2.

Configuration of Holding Member

The holding member 92 is fixed to one of the fixing portions 42 to 44 in a state of holding the coil 8A and the terminal portion 93. The holding member 92 includes a first plate-shaped portion 921 orthogonal to the +Y direction and a second plate-shaped portion 922 standing from the first plate-shaped portion 921 in the +Y direction. The holding member 92 is made of a ferromagnetic material, and is formed in a substantially L shape when viewed from a lateral side.

A surface of the first plate-shaped portion 921 in the −Y direction is in contact with one of the fixing portions 42 to 44. The terminal portion 93 is attached to the surface of the first plate-shaped portion 921 in the +Y direction.

The coil 8A is attached to a surface of the second plate-shaped portion 922 in a direction opposite from a direction in which the first plate-shaped portion 921 extends from the second plate-shaped portion 922. That is, the coil 8A is attached to a surface of the second plate-shaped portion 922 facing the magnet 7A. Since the holding member 92 is made of the ferromagnetic material, the second plate-shaped portion 922 functions as a yoke that controls a direction of the magnetic field generated by the coil 8A. That is, the vibration generation device 3A includes the holding member 92 including the second plate-shaped portion 922 which is a coil-side yoke disposed at an opposite side of the coil 8A from the magnet 7A, and the holding member 92 is a ferromagnetic holding member that holds the coil 8A.

Configuration of Terminal Portion

The terminal portion 93 is electrically coupled to the operation control unit 26 of the vibration reduction device 2, and supplies a current supplied from the operation control unit 26 to the control unit (not shown). The control unit causes the coil 8A to generate the magnetic field by energizing the coil 8A, thereby applying a driving force to the arm 51 including the magnet 7A to swing the arm 51. Specifically, the control unit causes an AC current to flow through the coil 8A to alternately reverse the direction of the magnetic field generated by the coil 8A, thereby swinging the pendulum 5A around the rotation axis Rx. That is, the control unit alternately switches the direction of the current flowing through the coil 8A.

When the AC current flows through the coil 8A, a magnetic field is generated from one of the first extending portion 8A1 and the second extending portion 8A2 toward the other extending portion. That is, one of the extending portions is an N pole, and the other extending portion is an S pole. The control unit causes an AC current of a predetermined frequency to flow through the coil 8A, thereby alternately switching the magnetic pole of the first extending portion 8A1 and the magnetic pole of the second extending portion 8A2.

As described above, the magnetic pole of the surface 7A11 of the first magnet member 7A1 facing the first extending portion 8A1 in a non-contact manner is different from the magnetic pole of the surface 7A21 of the second magnet member 7A2 facing the second extending portion 8A2 in a non-contact manner.

Therefore, when the AC current flows through the coil 8A, the arm 51 to which the magnet 7A is attached via the plate member 91 swings around the rotation axis Rx according to a frequency of the AC current. The frequency of the AC current flowing through the coil 8A is set by the operation control unit 26 according to the vibration detected by the detection unit 25 provided in the vibration reduction device 2. Accordingly, the vibration generation device 3A can generate the vibration opposite in phase from the vibration propagated to the projection optical device 12, and therefore the vibration of the projection optical device 12 can be reduced.

Specific Disposition of Configurations of First Driving Unit, Second Driving Unit, and Third Driving Unit As described above, the vibration generation device 3A includes at least one driving unit 6A. In the embodiment, the vibration generation device 3A includes a plurality of driving units 6A, and the plurality of driving units 6A include the first driving unit 61, the second driving unit 62, and the third driving unit 63.

In other words, each of the first driving unit 61, the second driving unit 62, and the third driving unit 63 is one of the plurality of driving units 6A provided in the vibration generation device 3A. The first driving unit 61 is provided in the +Z direction with respect to the arm 51, the second driving unit 62 is provided in the +X direction with respect to the arm 51, and the third driving unit 63 is provided in the −X direction with respect to the arm 51.

Specifically, the first driving unit 61 includes the magnet 7A, the coil 8A, the plate member 91, the holding member 92, and the terminal portion 93, and further includes a control unit (not shown). The magnet 7A of the first driving unit 61 corresponds to a first magnet, and the coil 8A of the first driving unit 61 corresponds to a first coil.

In the first driving unit 61, the plate member 91 is attached to the attachment portion 5261 provided at the first side surface portion 526 of the arm main body 52.

The first magnet member 7A1 and the second magnet member 7A2 constituting the magnet 7A are fixed to a surface of the plate member 91 in the +Z direction such that a longitudinal axis of each of the magnet members 7A1 and 7A2 is along the +X direction. That is, the magnet 7A of the first driving unit 61 is provided at the first side surface portion 526 to be separated from the rotation axis Rx.

The first plate-shaped portion 921 of the holding member 92 is fixed to the fixing portion 42 of the base 4A.

The coil 8A is attached to a surface of the second plate-shaped portion 922 of the holding member 92 facing the magnet 7A in the −Z direction to face the magnet 7A in a non-contact manner. Specifically, the coil 8A is disposed such that the first extending portion 8A1 faces the first magnet member 7A1 in the +Z direction in a non-contact manner and the second extending portion 8A2 faces the second magnet member 7A2 in the +Z direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

The second driving unit 62 includes the magnet 7A, the coil 8A, the plate member 91, the holding member 92, and the terminal portion 93, and further includes a control unit (not shown). The magnet 7A of the second driving unit 62 corresponds to a second magnet, and the coil 8A of the second driving unit 62 corresponds to a second coil.

In the second driving unit 62, the plate member 91 is attached to the attachment portion 5271 provided at the second side surface portion 527 of the arm 51.

The first magnet member 7A1 and the second magnet member 7A2 constituting the magnet 7A are fixed to a surface of the plate member 91 in the +X direction such that the longitudinal axis of each of the magnet members 7A1 and 7A2 is along the +Z direction. That is, the magnet 7A of the second driving unit 62 is provided at the second side surface portion 527 to be separated from the rotation axis Rx.

The first plate-shaped portion 921 of the holding member 92 is fixed to the fixing portion 43 of the base 4A.

The coil 8A is attached to a surface of the second plate-shaped portion 922 of the holding member 92 facing the magnet 7A in the −X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

The third driving unit 63 includes the magnet 7A, the coil 8A, the plate member 91, the holding member 92, and the terminal portion 93, and further includes a control unit (not shown). The magnet 7A of the third driving unit 63 corresponds to a third magnet, and the coil 8A of the third driving unit 63 corresponds to a third coil.

In the third driving unit 63, the plate member 91 is attached to the attachment portion 5281 provided at the third side surface portion 528 of the arm 51.

The first magnet member 7A1 and the second magnet member 7A2 constituting the magnet 7A are fixed to a surface of the plate member 91 in the −X direction such that the longitudinal axis of each of the magnet members 7A1 and 7A2 is along the +Z direction. That is, the magnet 7A of the third driving unit 63 is provided at the third side surface portion 528 to be separated from the rotation axis Rx.

The first plate-shaped portion 921 of the holding member 92 is fixed to the fixing portion 44 of the base 4A.

The coil 8A is attached to a surface of the second plate-shaped portion 922 of the holding member 92 facing the magnet 7A in the +X direction to face the magnet 7A in a non-contact manner. Specifically, the coil 8A is disposed such that the first extending portion 8A1 faces the first magnet member 7A1 in the +X direction in a non-contact manner and the second extending portion 8A2 faces the second magnet member 7A2 in the +X direction in a non-contact manner.

As described above, a magnetic pole of a surface of the first magnet member 7A1 facing the first extending portion 8A1 is different from a magnetic pole of a surface of the second magnet member 7A2 facing the second extending portion 8A2.

Synchronization of Driving Units

The control units of the driving units 61 to 63 cause the coils 8A to generate the magnetic fields by causing the AC currents to flow through the corresponding coils 8A. At this time, the control units cause the AC currents of the same frequency and the same phase to flow through the coils 8A such that the first extending portions 8A1 of the coils 8A of the driving units 61 to 63 have the same magnetic pole and the second extending portions 8A2 of the coils 8A of the driving units 61 to 63 have the same magnetic pole.

Accordingly, one of the driving units 61 to 63 can be prevented from interfering with the swing of the pendulum 5A by another driving unit. In addition, since the pendulum 5A can be swung by driving forces of the driving units 61 to 63, a rotational torque when the pendulum 5A swings can be increased. The driving units 61 to 63 may share a single control unit.

Effects of First Embodiment

The projector 1 according to the embodiment described above has the following effects.

The projector 1 corresponds to the electronic apparatus. The projector 1 includes the vibration reduction device 2. The vibration reduction device 2 includes the vibration generation device 3A, the detection unit 25, and the operation control unit 26.

The detection unit 25 detects the vibration of the projection optical device 12 which is an object. The operation control unit 26 causes the vibration generation device 3A to generate vibration opposite in phase from the vibration detected by the detection unit 25.

The vibration generation device 3A includes the base 4A, the arm 51, and at least one driving unit 6A. The base 4A transmits the vibration to the object. The arm 51 is provided at the base 4A swingably around the rotation axis Rx.

In the embodiment, a plurality of driving units 6A are provided in the vibration generation device 3A. The driving unit 6A swings the arm 51. The driving unit 6A includes the magnet 7A and the coil 8A disposed to face the magnet 7A in a non-contact manner. The magnet 7A, which is one of the magnet 7A and the coil 8A, is disposed at a position separated from the rotation axis Rx at the arm 51.

The arm 51 includes the disposition portions 524 and 525 and the weight portion 53. The disposition portions 524 and 525 are provided at positions separated from the rotation axis Rx at the arm 51. The weight portion 53 is detachably attached to the disposition portions 524 and 525.

According to such a configuration, the weight and the center of gravity of the arm 51 can be easily changed by changing the configuration of the weight portion 53 attached to the disposition portions 524 and 525. Therefore, a magnitude of the vibration generated by swing of the arm 51 in the vibration generation device 3A can be easily adjusted.

Further, since the vibration generation device 3A can generate the vibration opposite in phase from the vibration detected by the detection unit 25, the vibration of an electronic apparatus, which is an installation target of the vibration reduction device 2, can be reduced.

In the vibration generation device 3A, the weight portion 53 includes at least one weight portion member 54. Each of the disposition portions 524 and 525 is configured such that a plurality of the weight portion members 54 can be disposed at the disposition portion.

According to such a configuration, the weight and a shape of the weight portion 53, hence the weight and the center of gravity of the arm 51 can be easily adjusted by adjusting the number and positions of the weight portion members 54 disposed at the disposition portions 524 and 525. Therefore, the magnitude of the vibration generated by the swing of the arm 51 in the vibration generation device 3A can be easily adjusted.

In the vibration generation device 3A, the weight portion member 54 is capable of being disposed at the disposition portions 524 and 525 in a stacked way.

According to such a configuration, the weight portion member 54 can be further disposed in a stacked way with respect to the weight portion member 54 disposed at the disposition portion 524 or the disposition portion 525. Accordingly, since more weight portion members 54 can be disposed at the disposition portions 524 and 525, an increase in a size of the arm 51 can be prevented, and the weight and a shape pattern of the weight portion 53 can be increased. Therefore, the weight and a pattern of the center of gravity of the arm 51 can be increased, and therefore the vibration generated by the vibration generation device 3A can be more finely adjusted.

In the vibration generation device 3A, the weight portion member 54 may be formed in a substantially rectangular parallelepiped shape.

According to such a configuration, the weight portion members 54 can be easily disposed in a stacked way.

In the vibration generation device 3A, the weight portion member 54 is disposed along the rotation axis Rx. The disposition portion 524 is configured such that the plurality of weight portion members 54 can be disposed in the direction orthogonal to the rotation axis Rx when viewed from a position facing the disposition portion 524. Similarly, the disposition portion 525 can dispose the plurality of weight portion members 54 in the direction orthogonal to the rotation axis Rx when viewed from a position facing the disposition portion 525.

Here, when the weight portion member 54 is disposed along the direction orthogonal to the rotation axis Rx when viewed from the position facing the disposition portion 524, the position of the center of gravity of the arm 51 does not greatly change between a case where one weight portion member 54 is disposed at the disposition portion 524 and a case where two weight portion members 54 are disposed at the disposition portion 524. The same applies to a case where the weight portion member 54 is disposed at the disposition portion 525 along the direction orthogonal to the rotation axis Rx.

In contrast, when the weight portion member 54 is disposed along the rotation axis Rx when viewed from the position facing the disposition portion 524, a weight can be easily added to an opposite-side end portion of the arm 51 from the rotation axis Rx, that is, the end portion of the arm 51 on the first side surface portion 526 side. Accordingly, the position of the center of gravity of the arm 51 can be greatly changed between the case where one weight portion member 54 is disposed at the disposition portion 524 and the case where two weight portion members 54 are disposed at the disposition portion 524. Similarly, the position of the center of gravity of the arm 51 can be greatly changed between a case where one weight portion member 54 is disposed at the disposition portion 525 and a case where two weight portion members 54 are disposed at the disposition portion 525. Therefore, the position of the center of gravity of the arm 51 can be easily adjusted.

In the vibration generation device 3A, the arm 51 is detachably attached to the base 4A. Specifically, the arm 51 is attached to the base 4A by the rotation axis portion 55, and the rotation axis portion 55 can be attached to and detached from the base 4A.

According to such a configuration, the weight portion 53 can be disposed at the disposition portions 524 and 525 of the arm 51 in a state where the arm 51 is removed from the base 4A. Therefore, the weight portion 53 can be easily disposed at the arm 51.

First Modification of First Embodiment

In the vibration generation device 3A described above, the magnet 7A includes the first magnet member 7A1 and the second magnet member 7A2 separated from each other in the −Y direction from the first extending portion 8A1 toward the second extending portion 8A2. However, a magnet provided in the arm 51 is not limited thereto, and may be one magnet facing the first extending portion 8A1 and the second extending portion 8A2.

Figure 14:
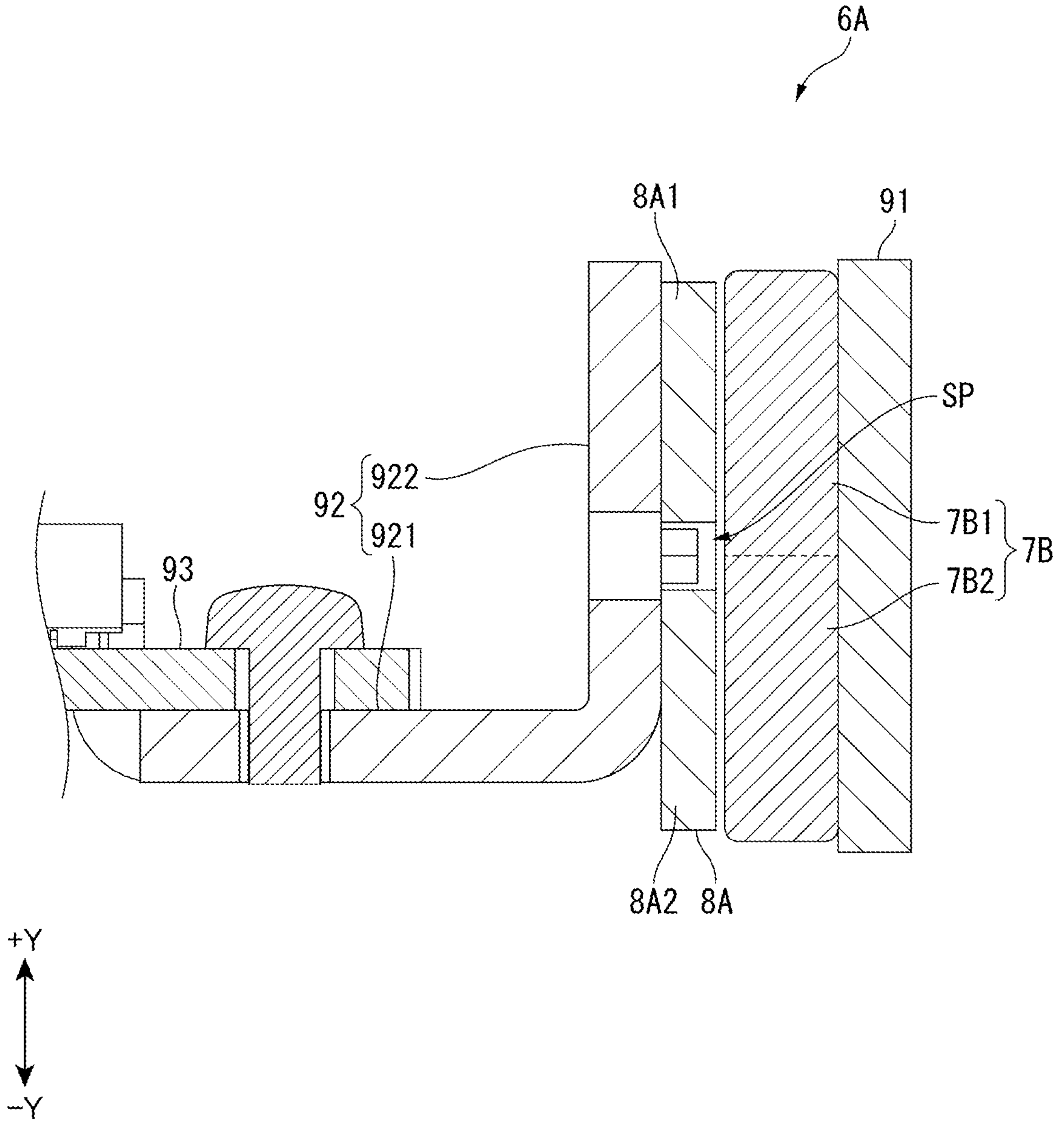
FIG. 14 is a view showing a modification of the driving unit according to the first embodiment.

FIG. 14 is a cross-sectional view showing a first modification of the driving unit 6A. Specifically, FIG. 14 is a cross-sectional view showing a magnet 7B that is a deformation of the magnet 7A provided in the driving unit 6A.

For example, the driving unit 6A used in the vibration generation device 3A may use the magnet 7B shown in FIG. 14 instead of the magnet 7A. That is, at least one of the first driving unit 61, the second driving unit 62, and the third driving unit 63 may include the magnet 7B instead of the magnet 7A.

Unlike the magnet 7A including the first magnet member 7A1 and the second magnet member 7A2, the magnet 7B is formed by a single magnet member.

The magnet 7B is formed in a rectangular parallelepiped shape having a longitudinal axis substantially parallel to a longitudinal axis of the coil 8A, and is fixed to the plate member 91 to face the coil 8A in a non-contact manner. A dimension of the magnet 7B along the longitudinal axis is substantially the same as a dimension of the coil 8A along the longitudinal axis, and a dimension of the magnet 7B along the +Y direction orthogonal to the longitudinal axis is substantially the same as a dimension of the coil 8A along the +Y direction.

The magnet 7B includes a portion 7B1 facing the first extending portion 8A1 of the coil 8A and a portion 7B2 facing the second extending portion 8A2 of the coil 8A, and the portion 7B1 and the portion 7B2 are coupled to each other. A magnetic pole of a surface of the portion 7B1 facing the first extending portion 8A1 is different from a magnetic pole of a surface of the portion 7B2 facing the second extending portion 8A2. For example, the magnetic pole of the surface of the portion 7B1 facing the first extending portion 8A1 is an S pole, and the magnetic pole of the surface of the portion 7B2 facing the second extending portion 8A2 is an N pole.

The vibration generation device 3A including the driving unit 6A in which such a magnet 7B is used can also achieve the same effects as those described above.

Second Modification of First Embodiment

In the vibration generation device 3A described above, the driving unit 6A including the first driving unit 61, the second driving unit 62, and the third driving unit 63 includes the magnet 7A and the coil 8A. That is, the driving unit 6A includes the coil 8A implemented by an air-core coil. However, the driving unit is not limited thereto, and one driving unit may include a plurality of coils. For example, the one driving unit may include a plurality of coils disposed in parallel along longitudinal axes of the coils, and at least one magnet provided corresponding to each of the plurality of coils.

In this case, similarly to the magnet 7A described above, the at least one magnet may be a plurality of magnets each including a first magnet member and a second magnet member provided corresponding to each of the plurality of coils. In this case, the first magnet member may face the first extending portion of the corresponding coil among the plurality of coils in a non-contact manner, and the second magnet member may face the second extending portion of the corresponding coil among the plurality of coils in a non-contact manner.

Alternatively, the at least one magnet may include one first magnet member disposed across the first extending portions of the plurality of coils and facing the first extending portions in a non-contact manner, and one second magnet member disposed across the second extending portions of the plurality of coils and facing the second extending portions in a non-contact manner.

Alternatively, similarly to the magnet 7B described above, the at least one magnet may be one magnet member including a portion facing the first extending portion of the corresponding coil among the plurality of coils in a non-contact manner and a portion facing the second extending portion of the corresponding coil among the plurality of coils in a non-contact manner.

Alternatively, the at least one magnet may be one magnet member including a portion disposed across the first extending portions of the plurality of coils and facing the first extending portions in a non-contact manner, and a portion facing the second extending portion of the corresponding coil among the plurality of coils in a non-contact manner.

Third Modification of First Embodiment

In the vibration generation device 3A described above, the arm 51 is supported swingably around the rotation axis Rx by the rotation axis portion 55 attached to the attachment portion 41 provided at an end portion of the base 4A in the −Z direction. In other words, the rotation axis portion 55 supporting the arm 51 swingably around the rotation axis Rx is attached to the attachment portion 41 provided at the end portion of the base 4A in the −Z direction. However, the attachment portion 41 is not limited thereto, and may be provided closer to the +Z direction than is the end portion of the base 4A in the −Z direction.

Figure 15:
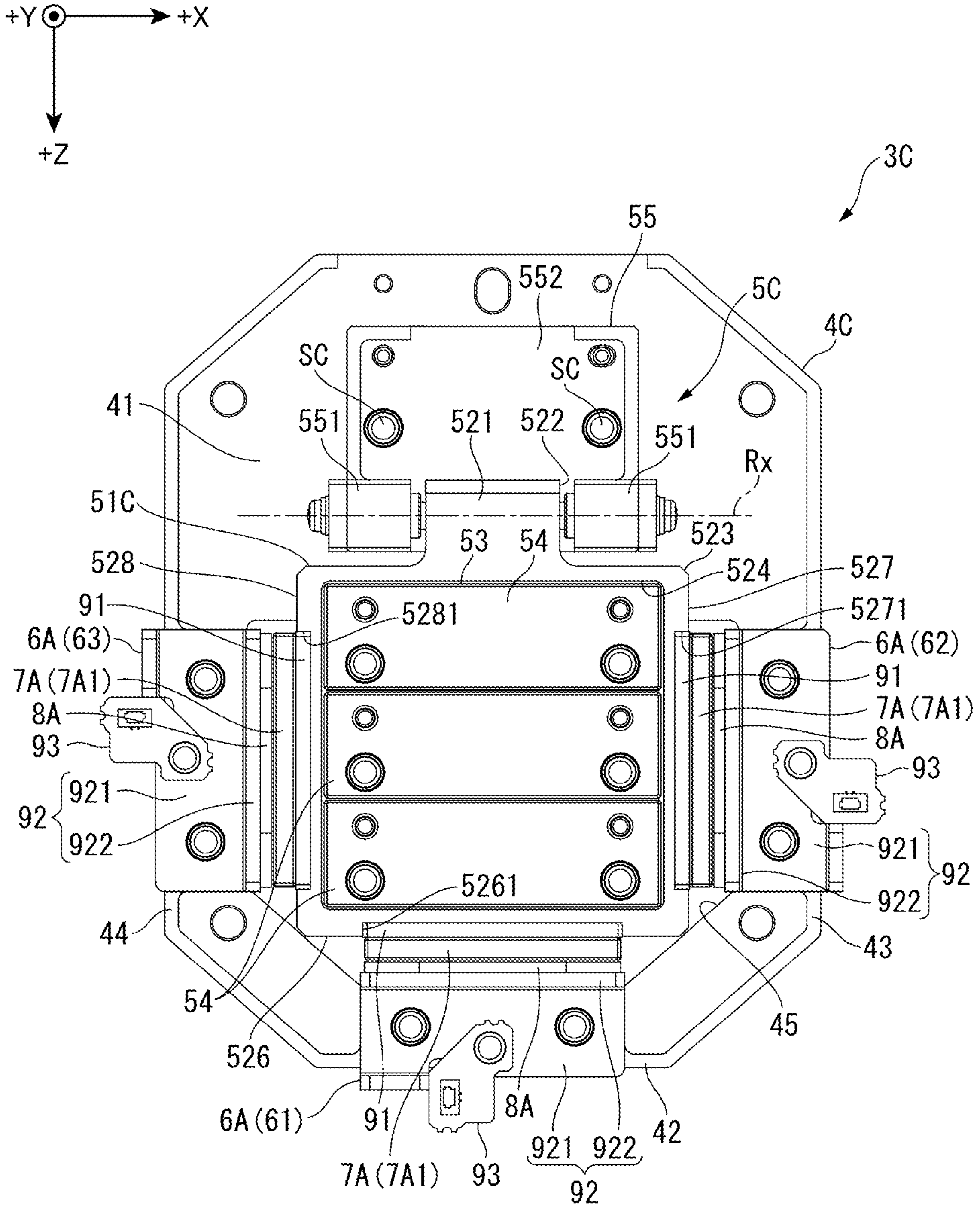
FIG. 15 is a view showing a modification of the vibration generation device according to the first embodiment.

FIG. 15 is a plan view showing a third modification of the vibration generation device 3A. Specifically, FIG. 15 is a plan view showing a base 4C and a pendulum 5C that are deformations of the base 4A and the pendulum 5A of the vibration generation device 3A.

For example, the vibration generation device 3A may use the base 4C and the pendulum 5C shown in FIG. 15 instead of the base 4A and the pendulum 5A. The base 4C is different from the base 4A in a position of the attachment portion 41 to which the rotation axis portion 55 is attached. The pendulum 5C includes an arm 51C that is different from that of the arm 51 in a dimension between the coupling portion 521 and the enlarged portion 523, and in addition, a direction of the rotation axis portion 55 is different.

Specifically, in the base 4C, the attachment portion 41 is disposed closer to the +Z direction than is an end portion of the base 4C in the −Z direction. That is, the attachment portion 41 is provided at a position between the end portion of the base 4C in the −Z direction and the relief portion 45.

In addition, according to the position of the attachment portion 41 in the base 4C, a dimension between the coupling portion 521 and the enlarged portion 523 in the arm 51C is smaller than a dimension between the coupling portion 521 and the enlarged portion 523 in the arm 51. That is, the arm 51C does not include the extending portion 522 coupled from the coupling portion 521 to the enlarged portion 523, and includes the enlarged portion 523 and a portion that is coupled from the enlarged portion 523 and is supported by the pair of support portions 551 of the rotation axis portion 55. An end portion of the enlarged portion 523 in the −Z direction is adjacent to the pair of support portions 551. Further, in the pendulum 5C, the rotation axis portion 55 is attached to the attachment portion 41 in a state of being rotated by 180° around an axis along the +Y direction. Specifically, in the rotation axis portion 55 of the pendulum 5C, the pair of support portions 551 are provided at an end portion of the mounting portion 552 in the +Z direction.

According to the vibration generation device 3A in which such a base 4C and such a pendulum 5C are used as well, the same effects as those described above can be achieved, and a size of the vibration generation device 3A can be reduced.

Fourth Modification of First Embodiment

The vibration generation device 3A or 3C described above includes the first driving unit 61, the second driving unit 62, and the third driving unit 63 which are the driving units 6A. However, the vibration generation device 3A or 3C is not limited thereto, and may include one or two of the first driving unit 61, the second driving unit 62, and the third driving unit 63. For example, the vibration generation device 3A or 3C may include only the first driving unit 61, or may include only at least one of two driving units of the second driving unit 62 and the third driving unit 63.

Second Embodiment

Next, a second embodiment according to the present disclosure will be described.

A projector according to the embodiment has the same configuration as that of the projector 1 according to the first embodiment, and is different from the projector 1 according to the first embodiment in a configuration of an arm provided in a vibration generation device. In the following description, the same or substantially the same parts as those described above are denoted by the same reference numerals, and the description thereof will be omitted.

Figure 16:
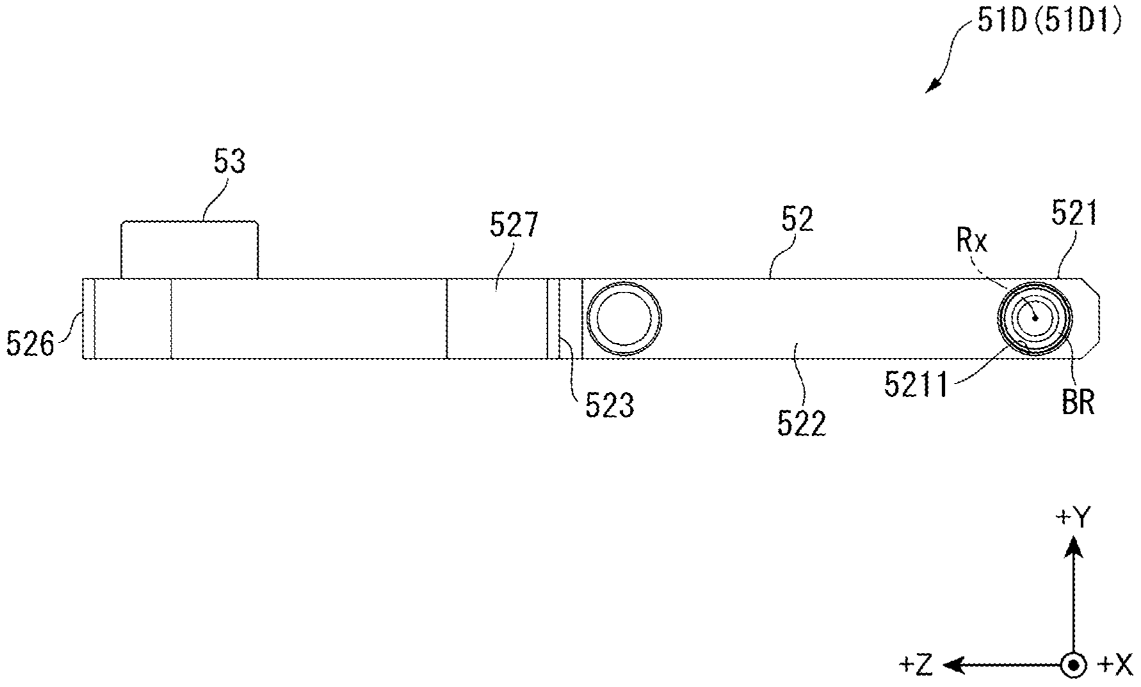
FIG. 16 is a side view showing an example of an arm provided in a vibration generation device according to a second embodiment.
Figure 17:
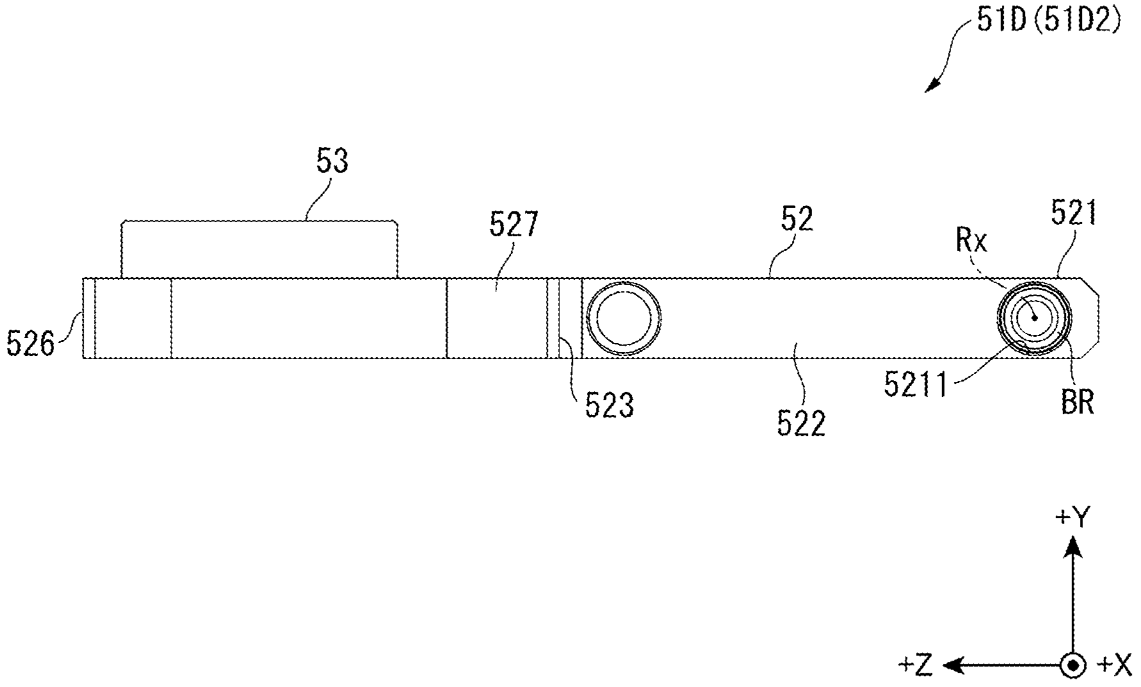
FIG. 17 is a side view showing an example of the arm provided in the vibration generation device according to the second embodiment.
Figure 18:
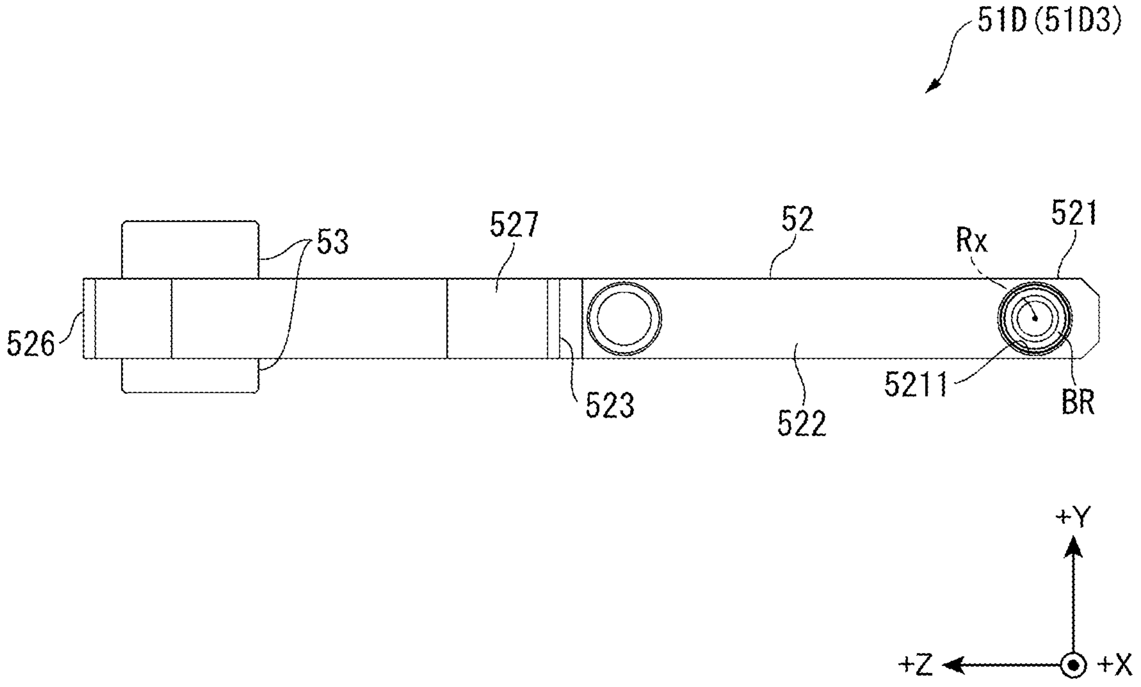
FIG. 18 is a side view showing an example of the arm provided in the vibration generation device according to the second embodiment.

FIGS. 16 to 18 are side views showing examples of an arm 51D provided in the vibration generation device 3A according to the embodiment. That is, FIGS. 16 to 18 are side views showing arms 51D1, 51D2, and 51D3 each being one of the arms 51D.

The projector and a vibration reduction device according to the embodiment have the same configuration and function as those of the projector 1 and the vibration reduction device 2 according to the first embodiment except that the projector and the vibration reduction device according to the embodiment include the vibration generation device 3A including the arm 51D instead of the arm 51. That is, the pendulum 5A of the vibration generation device 3A according to the embodiment includes one of a plurality of arms 51D, which is an example shown in FIGS. 16 to 18, instead of the arm 51.

The arm 51D has a configuration in which the arm main body 52 and the weight portion 53 are integrally formed. Specifically, the arm 51D is selected from the plurality of arms 51D whose weight s 53 have different positions, shapes, and weights and is used.

Among the plurality of arms 51D, the arm 51D1 shown in FIG. 16 is formed in the same manner as the arm 51 in which one weight portion member 54 is disposed at a position in the +Z direction at the disposition portion 524.

Among the plurality of arms 51D, the arm 51D2 shown in FIG. 17 is formed in the same manner as the arm 51 in which two weight portion members 54 are arranged side by side in the +Z direction at a position in a ZX direction at the disposition portion 524.

Among the plurality of arms 51D, the arm 51D3 shown in FIG. 18 is formed in the same manner as the arm 51 in which one weight portion member 54 is disposed at the position in the +Z direction at the disposition portion 524 and one weight portion member 54 is disposed at a position in the +Z direction at the disposition portion 525.

A portion of the arm 51D (51D1 to 51D3) corresponding to the weight portion member 54 is the weight portion 53 disposed at a position separated from the rotation axis Rx at the arm main body 52 of each of the arms 51D1 to 51D3. The arms 51D (51D1 to 51D3) differ in at least one of the weight and the shape of the weight portion 53 in the arm 51D.

When such an arm 51D is used in the vibration generation device 3A, a rotational torque generated by swing of the arm 51D is different. That is, in the embodiment, in the vibration generation device 3A, an arm is selected from a plurality of types of arms 51D that differ in rotational torque generated at the time of swing, and is mounted to the base 4A. Accordingly, a magnitude of the vibration generated by the vibration generation device 3A can be adjusted, and versatility of the vibration generation device 3A, hence versatility of the vibration reduction device 2 can be increased.

Effects of Second Embodiment

The projector according to the embodiment described above has the following effects in addition to the same effects as those of the projector 1 according to the first embodiment.

The vibration generation device 3A according to the embodiment includes the base 4A, the arm 51D, and at least one driving unit 6A. The base 4A transmits the vibration to the object. The arm 51D is detachably attached to the base 4A, and is swingable around the rotation axis Rx. The driving unit 6A includes the magnet 7A and the coil 8A disposed to face the magnet 7A in a non-contact manner. As described above, the magnet 7A, which is one of the magnet 7A and the coil 8A, is disposed at a position separated from the rotation axis Rx at the arm 51D. The arm 51D is selected from the plurality of types of arms 51D that differ in rotational torque generated by the swing of the arm 51D, and is mounted to the base 4A.

According to such a configuration, by changing the arm 51D mounted at the base 4A, the magnitude of the vibration of the vibration generation device 3A generated by the swing of the arm 51D can be adjusted. Therefore, the magnitude of the vibration generated by the vibration generation device 3A can be easily adjusted.

In the vibration generation device 3A according to the embodiment, the arm 51D includes the coupling portion 521 supported by the rotation axis portion 55, that is coupled to the base 4A, swingably around the rotation axis Rx, and the weight portion 53 disposed at the position separated from the rotation axis Rx. The plurality of types of arms 51D differ in at least one of the weight and the shape of the weight portion 53 in the arm 51D.

According to such a configuration, by changing the arm 51D mounted at the base 4A, the rotational torque generated by the swing of the arm 51D can be adjusted, and the magnitude of the vibration generated by the vibration generation device 3A can be reliably adjusted.

Third Embodiment

Next, a third embodiment according to the present disclosure will be described.

A projector according to the embodiment has the same configuration as that of the projector 1 according to the first embodiment, and is different from the projector 1 according to the first embodiment in that a vibration generation device includes driving units disposed at an opposite side of a rotation axis of an arm from the first driving unit, the second driving unit, and the third driving unit. In the following description, the same or substantially the same parts as those described above are denoted by the same reference numerals, and the description thereof will be omitted.

Figure 19:
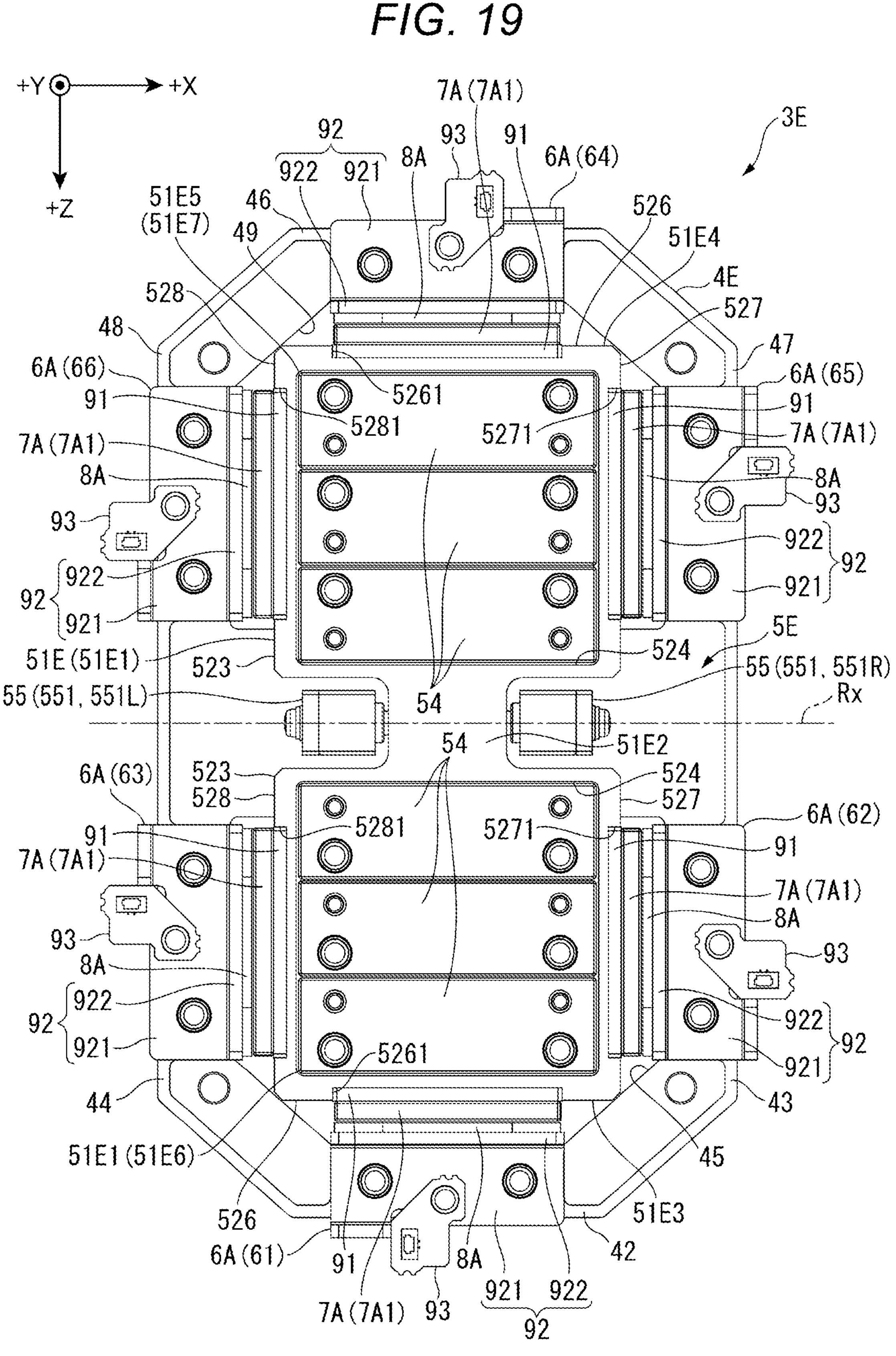
FIG. 19 is a plan view showing a vibration generation device according to a third embodiment.

FIG. 19 is a plan view of a vibration generation device 3E of a vibration reduction device provided in the projector according to the embodiment as viewed from the +Y direction.

The projector according to the embodiment has the same configuration and function as those of the projector 1 according to the first embodiment except that the projector according to the embodiment includes the vibration generation device 3E shown in FIG. 19 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3E instead of the vibration generation device 3A.

The vibration generation device 3E has the same configuration and function as those of the vibration generation device 3A according to the first embodiment except that the vibration generation device 3E includes a base 4E and a pendulum 5E instead of the base 4A and the pendulum 5A, and further includes a fourth driving unit 64, a fifth driving unit 65, and a sixth driving unit 66. That is, the vibration generation device 3E includes the base 4E, the pendulum 5E, and a plurality of driving units 6A, and the plurality of driving units 6A include the fourth driving unit 64, the fifth driving unit 65, and the sixth driving unit 66 in addition to the first driving unit 61, the second driving unit 62, and the third driving unit 63.

Configuration of Base

The base 4E supports the pendulum 5E. The holding member 92 of each of the driving units 61 to 66 is fixed to the base 4E.

The base 4E has the same configuration and function as those of the base 4A except that the base 4E further includes fixing portions 46, 47, and 48 and a relief portion 49. That is, the base 4E includes the attachment portion 41, the fixing portions 42 to 44 and 46 to 48, and the relief portions 45 and 49.

In the base 4E, the attachment portion 41 is provided at a center of the base 4E in the +Z direction with the pendulum 5E sandwiched along the +X direction.

The fixing portions 46 to 48 are provided on a side opposite to the fixing portions 42 to 44 with the attachment portion 41 sandwiched therebetween. That is, the fixing portions 46 to 48 are provided at positions in the −Z direction with respect to the attachment portion 41. Among the fixing portions 46 to 48, the fixing portion 46 provided in the −Z direction is a portion to which the holding member 92 of the fourth driving unit 64 is fixed. The fixing portion 47 provided in the +X direction is a portion to which the holding member 92 of the fifth driving unit 65 is fixed, and the fixing portion 48 provided in the −X direction is a portion to which the holding member 92 of the sixth driving unit 66 is fixed.

That is, the fixing portion 47 is a portion extending in the −Z direction, which is an extending direction of a second arm 51E4 from the rotation axis Rx, from an end portion of the attachment portion 41 in the +X direction along the rotation axis Rx.

The fixing portion 48 is a portion extending in the −Z direction, which is the extending direction of the second arm 51E4 from the rotation axis Rx, from an end portion of the attachment portion 41 in the −X direction along the rotation axis Rx. The fixing portion 46 is a portion for coupling opposite-side end portions of the fixing portions 47 and 48 from the attachment portion 41.

The relief portion 49 is a portion for preventing an end portion of the pendulum 5E in the −Z direction from coming into contact with the base 4E when the pendulum 5E swings. In the embodiment, similarly to the relief portion 45, the relief portion 49 is an opening penetrating the base 4E along the +Y direction. However, the relief portion 49 is not limited thereto, and may be a recess that opens in the +Y direction or the −Y direction.

Configuration of Pendulum

The pendulum 5E is supported by the base 4E. The pendulum 5E includes an arm 51E and the rotation axis portion 55.

The arm 51E is supported swingably around the rotation axis Rx extending along the +X direction, by the rotation axis portion 55 mounted at the base 4E. In other words, the arm 51E is attached to the base 4E swingably around the rotation axis Rx by the rotation axis portion 55. The arm 51E includes an arm main body 51E1 and a weight portion 51E5.

The arm main body 51E1 includes a coupling portion 51E2, a first arm 51E3, and the second arm 51E4. The weight portion 51E5 includes a first weight portion 51E6 provided at the first arm 51E3 and a second weight portion 51E7 provided at the second arm 51E4.

The coupling portion 51E2 is provided at a center of the arm main body 51E1 in the +Z direction orthogonal to the rotation axis Rx, and couples the first arm 51E3 and the second arm 51E4. The coupling portion 51E2 has the same configuration as that of the coupling portion 521, and is supported swingably around the rotation axis Rx by the pair of support portions 551 of the rotation axis portion 55.

The first arm 51E3 extends in the +Z direction from the coupling portion 51E2. Similarly to the arm main body 52, the first arm 51E3 includes the enlarged portion 523, the disposition portions 524 and 525, the first side surface portion 526, the second side surface portion 527, and the third side surface portion 528. In FIG. 19, illustration of the disposition portion 525 is omitted.

In the enlarged portion 523 of the first arm 51E3, the plate member 91 and the magnet 7A of the first driving unit 61 are attached to the first side surface portion 526 facing the +Z direction. In the enlarged portion 523 of the first arm 51E3, the plate member 91 and the magnet 7A of the second driving unit 62 are attached to the second side surface portion 527 facing the +X direction. In the enlarged portion 523 of the first arm 51E3, the plate member 91 and the magnet 7A of the third driving unit 63 are attached to the third side surface portion 528 facing the −X direction.

The first weight portion 51E6 includes at least one weight portion member 54 fixed to at least one of the disposition portions 524 and 525 of the first arm 51E3.

The second arm 51E4 extends in the −Z direction from the coupling portion 51E2. That is, the second arm 51E4 extends from the rotation axis Rx in a direction opposite from a direction in which the first arm 51E3 extends from the rotation axis Rx. The second arm 51E4 has a structure linearly symmetrical to the first arm 51E3 with respect to the rotation axis Rx. Specifically, the second arm 51E4 includes the enlarged portion 523, the disposition portions 524 and 525, the first side surface portion 526, the second side surface portion 527, and the third side surface portion 528. In FIG. 19, illustration of the disposition portion 525 is omitted.

In the enlarged portion 523 of the second arm 51E4, the plate member 91 and the magnet 7A of the fourth driving unit 64 are attached to the first side surface portion 526 facing the −Z direction. In the enlarged portion 523 of the second arm 51E4, the plate member 91 and the magnet 7A of the fifth driving unit 65 are attached to the second side surface portion 527 facing the +X direction. In the enlarged portion 523 of the second arm 51E4, the plate member 91 and the magnet 7A of the sixth driving unit 66 are attached to the third side surface portion 528 facing the −X direction.

The second weight portion 51E7 includes at least one weight portion member 54 fixed to at least one of the disposition portions 524 and 525 of the second arm 51E4.

Configuration and Disposition of Driving Unit

The first driving unit 61, the second driving unit 62, and the third driving unit 63 correspond to a first-arm-side driving unit that applies a driving force for swinging the arm 51E to the first arm 51E3. The fourth driving unit 64, the fifth driving unit 65, and the sixth driving unit 66 correspond to a second arm-side driving unit that applies a driving force for swinging the arm 51E to the second arm 51E4. As described above, the fourth driving unit 64, the fifth driving unit 65, and the sixth driving unit 66 are included in the plurality of driving units 6A provided in the vibration generation device 3E. That is, each of the driving units 61 to 66 includes the magnet 7A, the coil 8A, the plate member 91, the holding member 92, and the terminal portion 93, and further includes a control unit (not shown).

In the first driving unit 61 of the vibration generation device 3E, the plate member 91 is attached to the first side surface portion 526 of the first arm 51E3. The first magnet member 7A1 and the second magnet member 7A2 constituting the magnet 7A are fixed to a surface of the plate member 91 in the +Z direction such that longitudinal axes thereof are along the +X direction. That is, the magnet 7A of the first driving unit 61 is a first-arm-side magnet, and is provided at a position separated from the rotation axis Rx at the first arm 51E3. The first plate-shaped portion 921 of the holding member 92 is fixed to the fixing portion 42 of the base 4E. The coil 8A is attached to a surface of the second plate-shaped portion 922 of the holding member 92 in the −Z direction to face the magnet 7A in a non-contact manner. The coil 8A of the first driving unit 61 is a first-arm-side coil. In the first driving unit 61, a magnetic pole of a surface of the first magnet member 7A1 facing the first extending portion 8A1 is different from a magnetic pole of a surface of the second magnet member 7A2 facing the second extending portion 8A2.

In the second driving unit 62 of the vibration generation device 3E, the plate member 91 is attached to the second side surface portion 527 of the first arm 51E3. The first magnet member 7A1 and the second magnet member 7A2 constituting the magnet 7A are fixed to a surface of the plate member 91 in the +X direction such that longitudinal axes thereof are along the +Z direction. That is, the magnet 7A of the second driving unit 62 is a first-arm-side magnet, and is provided at a position separated from the rotation axis Rx at the first arm 51E3. The first plate-shaped portion 921 of the holding member 92 is fixed to the fixing portion 43 of the base 4E. The coil 8A is attached to a surface of the second plate-shaped portion 922 of the holding member 92 in the −X direction to face the magnet 7A in a non-contact manner. The coil 8A of the second driving unit 62 is a first-arm-side coil. In the second driving unit 62, a magnetic pole of a surface of the first magnet member 7A1 facing the first extending portion 8A1 is different from a magnetic pole of a surface of the second magnet member 7A2 facing the second extending portion 8A2.

In the third driving unit 63 of the vibration generation device 3E, the plate member 91 is attached to the third side surface portion 528 of the first arm 51E3. The first magnet member 7A1 and the second magnet member 7A2 constituting the magnet 7A are fixed to a surface of the plate member 91 in the −X direction such that longitudinal axes thereof are along the +Z direction. That is, the magnet 7A of the third driving unit 63 is a first-arm-side magnet, and is provided at a position separated from the rotation axis Rx in the first arm 51E3. The first plate-shaped portion 921 of the holding member 92 is fixed to the fixing portion 44 of the base 4E. The coil 8A is attached to a surface of the second plate-shaped portion 922 of the holding member 92 in the +X direction to face the magnet 7A in a non-contact manner. The coil 8A of the third driving unit 63 is a first-arm-side coil. In the third driving unit 63 as well, a magnetic pole of a surface of the first magnet member 7A1 facing the first extending portion 8A1 is different from a magnetic pole of a surface of the second magnet member 7A2 facing the second extending portion 8A2.

In the fourth driving unit 64 of the vibration generation device 3E, the plate member 91 is attached to the first side surface portion 526 of the second arm 51E4. The first magnet member 7A1 and the second magnet member 7A2 constituting the magnet 7A are fixed to a surface of the plate member 91 in the −Z direction such that longitudinal axes thereof extend along the +X direction. That is, the magnet 7A of the fourth driving unit 64 is a second-arm-side magnet, and is provided at a position separated from the rotation axis Rx at the second arm 51E4. The first plate-shaped portion 921 of the holding member 92 is fixed to the fixing portion 46 of the base 4E. The coil 8A is attached to a surface of the second plate-shaped portion 922 of the holding member 92 in the +Z direction to face the magnet 7A in a non-contact manner. The coil 8A of the fourth driving unit 64 is a second-arm-side coil. In the fourth driving unit 64 as well, a magnetic pole of a surface of the first magnet member 7A1 facing the first extending portion 8A1 is different from a magnetic pole of a surface of the second magnet member 7A2 facing the second extending portion 8A2.

In the fifth driving unit 65 of the vibration generation device 3E, the plate member 91 is attached to the second side surface portion 527 of the second arm 51E4. The first magnet member 7A1 and the second magnet member 7A2 constituting the magnet 7A are fixed to a surface of the plate member 91 in the +X direction such that longitudinal axes thereof are along the +Z direction. That is, the magnet 7A of the fifth driving unit 65 is a second-arm-side magnet, and is provided at a position separated from the rotation axis Rx at the second arm 51E4. The first plate-shaped portion 921 of the holding member 92 is fixed to the fixing portion 47 of the base 4E. The coil 8A is attached to a surface of the second plate-shaped portion 922 of the holding member 92 facing the magnet 7A in the −X direction to face the magnet 7A in a non-contact manner. The coil 8A of the fifth driving unit 65 is a second-arm-side coil. In the fifth driving unit 65 as well, a magnetic pole of a surface of the first magnet member 7A1 facing the first extending portion 8A1 is different from a magnetic pole of a surface of the second magnet member 7A2 facing the second extending portion 8A2.

In the sixth driving unit 66 of the vibration generation device 3E, the plate member 91 is attached to the third side surface portion 528 of the second arm 51E4. The first magnet member 7A1 and the second magnet member 7A2 constituting the magnet 7A are fixed to a surface of the plate member 91 in the −X direction such that longitudinal axes thereof are along the +Z direction. That is, the magnet 7A of the sixth driving unit 66 is a second-arm-side magnet, and is provided at a position separated from the rotation axis Rx at the second arm 51E4. The first plate-shaped portion 921 of the holding member 92 is fixed to the fixing portion 48 of the base 4E. The coil 8A is attached to a surface of the second plate-shaped portion 922 of the holding member 92 facing the magnet 7A in the +X direction to face the magnet 7A in a non-contact manner. The coil 8A of the sixth driving unit 66 is a second-arm-side coil. In the sixth driving unit 66 as well, a magnetic pole of a surface of the first magnet member 7A1 facing the first extending portion 8A1 is different from a magnetic pole of a surface of the second magnet member 7A2 facing the second extending portion 8A2.

In this way, in the embodiment, the magnetic poles of the surfaces of the first magnet members 7A1 of the magnets 7A facing the first extending portions 8A1 are the same in the driving units 61 to 66, and the magnetic poles of the surfaces of the second magnet members 7A2 of the magnets 7A facing the second extending portions 8A2 are the same in the driving units 61 to 66.

Configuration of Control Unit

The control unit of each of the driving units 61 to 66 causes the coil 8A to generate a magnetic field by causing an AC current to flow through the corresponding coil 8A. At this time, the control units cause AC currents of the same frequency to flow through respective coils 8A such that the first extending portions 8A1 in the coils 8A of the driving units 61 to 63 disposed closer to the +Z direction than is the rotation axis Rx have the same magnetic pole and the first extending portions 8A1 in the coils 8A of the driving units 64 to 66 disposed closer to the −Z direction than is the rotation axis Rx have the same magnetic pole. Further, each control unit causes an AC current, which is obtained by shifting a phase of the AC current flowing through the coil 8A of each of the driving units 61 to 63 by a half cycle, to flow through the coil 8A of each of the driving units 64 to 66 such that a magnetic pole of the first extending portion 8A1 of the coil 8A of each of the driving units 61 to 63 is different from a magnetic pole of the first extending portion 8A1 of the coil 8A of each of the driving units 64 to 66. That is, the control units cause the AC currents of the same frequency to flow through the coils 8A such that directions of the magnetic fields generated in the coils 8A of the driving units 61 to 63 and directions of the magnetic fields generated in the coils 8A of the driving units 64 to 66 are opposite directions.

Accordingly, at least one of the driving units 61 to 66 can be prevented from interfering with the swing of the arm 51E generated by another driving unit. In addition, since the arm 51E can be swung by a driving force of each of the driving units 61 to 66, a rotational torque when the arm 51E swings can be increased. The driving units 61 to 66 may share the control unit.

The driving force of the arm 51E can be increased by disposing the weight portion members 54 disposed at the disposition portions 524 and 525 of the first arm 51E3 and the disposition portions 524 and 525 of the second arm 51E4 at positions separated from the rotation axis Rx. Positions of the weight portion members 54 disposed at the disposition portions 524 and 525 of the first arm 51E3 from the rotation axis Rx and positions of the weight portion members 54 disposed at the disposition portions 524 and 525 of the second arm 51E4 from the rotation axis Rx are symmetrically disposed with respect to the rotation axis Rx, and a position of a center of gravity of the arm 51E is disposed on the rotation axis Rx, and thus the arm 51E can be stably swung. The weight portion members 54 are not limited to being disposed symmetrically. The positions or the number of the weight portion members 54 may be different between the first arm 51E3 and the second arm 51E4, and the position of the center of gravity of the arm 51E may be shifted from the rotation axis Rx.

Effects of Third Embodiment

The projector according to the embodiment described above can achieve the same effects as those of the projector 1 according to the first embodiment.

Modification of Third Embodiment

In the vibration generation device 3E, as in the modifications of the first embodiment described above, one or two of the driving units 61 to 63 disposed in the +Z direction with respect to the rotation axis Rx may not be provided, and one or two of the driving units 64 to 66 disposed in the −Z direction with respect to the rotation axis Rx may not be provided.

The modifications of the first embodiment described above may be applied to the vibration generation device 3E.

Further, in the arm 51E provided in the vibration generation device 3E, similarly to the arm 51D according to the second embodiment, the first arm 51E3 and the first weight portion 51E6 may be integrated with each other, or the second arm 51E4 and the second weight portion 51E7 may be integrated with each other.

Fourth Embodiment

Next, a fourth embodiment according to the present disclosure will be described.

A projector according to the embodiment has the same configuration as that of the projector according to the first embodiment, and is different from the projector according to the first embodiment in that an arm is swingably attached to a base by a plate member. In the following description, the same or substantially the same parts as those described above are denoted by the same reference numerals, and the description thereof will be omitted.

Figure 20:
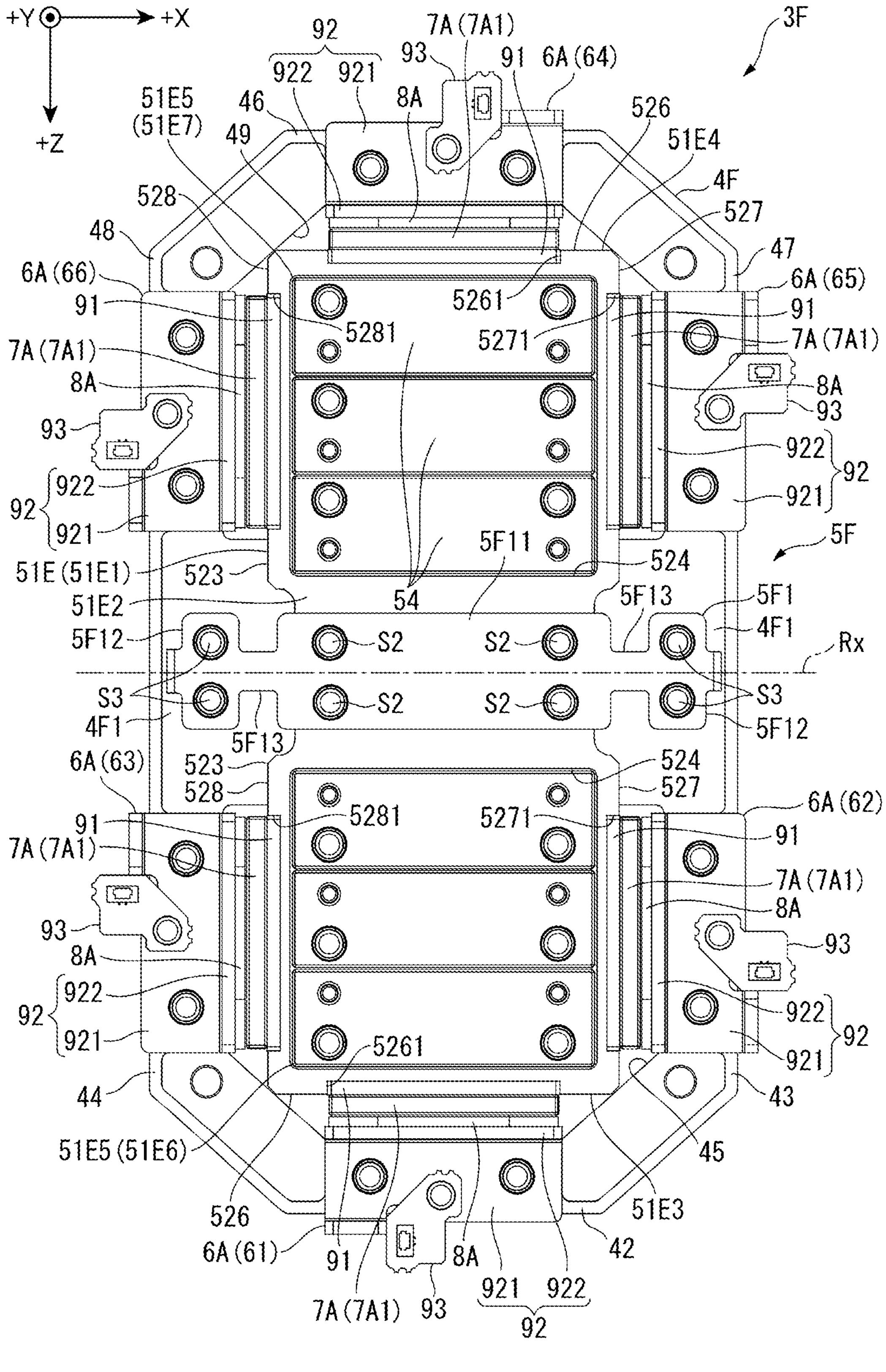
FIG. 20 is a plan view showing a vibration generation device according to a fourth embodiment.

FIG. 20 is a plan view of a vibration generation device 3F of a vibration reduction device provided in the projector according to the embodiment as viewed from the +Y direction.

The projector according to the embodiment has the same configuration and function as those of the projector 1 according to the first embodiment except that the projector according to the embodiment includes the vibration generation device 3F shown in FIG. 20 instead of the vibration generation device 3A. That is, the vibration reduction device according to the embodiment has the same configuration and function as those of the vibration reduction device 2 according to the first embodiment except that the vibration reduction device according to the embodiment includes the vibration generation device 3F instead of the vibration generation device 3A.

The vibration generation device 3F has the same configuration and function as those of the vibration generation device 3E according to the third embodiment except that the vibration generation device 3F includes a base 4F and a pendulum 5F instead of the base 4E and the pendulum 5E. That is, the vibration generation device 3F includes the base 4F, the pendulum 5F, and a plurality of driving units 6A, and the plurality of driving units 6A include the first driving unit 61, the second driving unit 62, the third driving unit 63, the fourth driving unit 64, the fifth driving unit 65, and the sixth driving unit 66.

Configuration of Base

The base 4F supports the pendulum 5F, and is a plate-shaped member to which the holding member 92 of each of the driving units 61 to 66 is fixed. The base 4F has the same configuration and function as those of the base 4E except that the base 4F includes attachment portions 4F1 instead of the attachment portion 41.

The attachment portions 4F1 are provided at a center of the base 4F in the +Z direction at positions sandwiching the arm 51E. A pair of attachment portions 5F12 provided in a plate member 5F1 constituting the pendulum 5F is fixed to the attachment portions 4F1.

Configuration of Pendulum

The pendulum 5F is attached to the base 4F. The pendulum 5F has the same configuration as that of the pendulum 5E except that the pendulum 5F includes the plate member 5F1 instead of the rotation axis portion 55. That is, the pendulum 5F includes the arm 51E and the plate member 5F1.

The plate member 5F1 is fixed to the base 4F along the +X direction, and constitutes the rotation axis Rx of the arm 51E. The plate member 5F1 includes a fixing portion 5F11, the pair of attachment portions 5F12, and a pair of torsion portions 5F13.

The fixing portion 5F11 is a portion of the plate member 5F1 that is fixed to the coupling portion 51E2 of the arm 51E. The fixing portion 5F11 is provided at a center of the plate member 5F1 in the +X direction, and is fixed to a surface of the coupling portion 51E2 in the +Y direction by screws S2.

The pair of attachment portions 5F12 are provided at positions sandwiching the fixing portion 5F11 in the +X direction. Each of the pair of attachment portions 5F12 is fixed to the corresponding attachment portion 4F1 of the attachment portions 4F1 by screws S3.

The pair of torsion portions 5F13 are disposed between the fixing portion 5F11 and the pair of attachment portions 5F12. Specifically, one torsion portion 5F13 of the pair of torsion portions 5F13 is provided between the fixing portion 5F11 and the attachment portion 5F12 of the pair of attachment portions 5F12 in the +X direction, and the other torsion portion 5F13 is provided between the fixing portion 5F11 and the attachment portion 5F12 of the pair of attachment portions 5F12 in the −X direction. The pair of torsion portions 5F13 linearly extend along the +X direction.

When the arm 51E is swung with respect to the base 4F by the driving units 61 to 66, the pair of torsion portions 5F13 are twisted around an axis along the +X direction, thereby enabling swing of the arm 51E. That is, an extension line of an axis coupling the pair of torsion portions 5F13 is the rotation axis Rx of the arm 51E.

Effects of Fourth Embodiment

The projector according to the embodiment described above has the same effects as those of the projector according to the third embodiment.

Modification of Fourth Embodiment

In the vibration generation device 3F described above, the plate member 5F1 includes the pair of torsion portions 5F13 along the +X direction. That is, the pair of torsion portions 5F13 extend linearly along the +X direction. However, the pair of torsion portions 5F13 are not limited thereto, and may have another shape.

Figure 21:
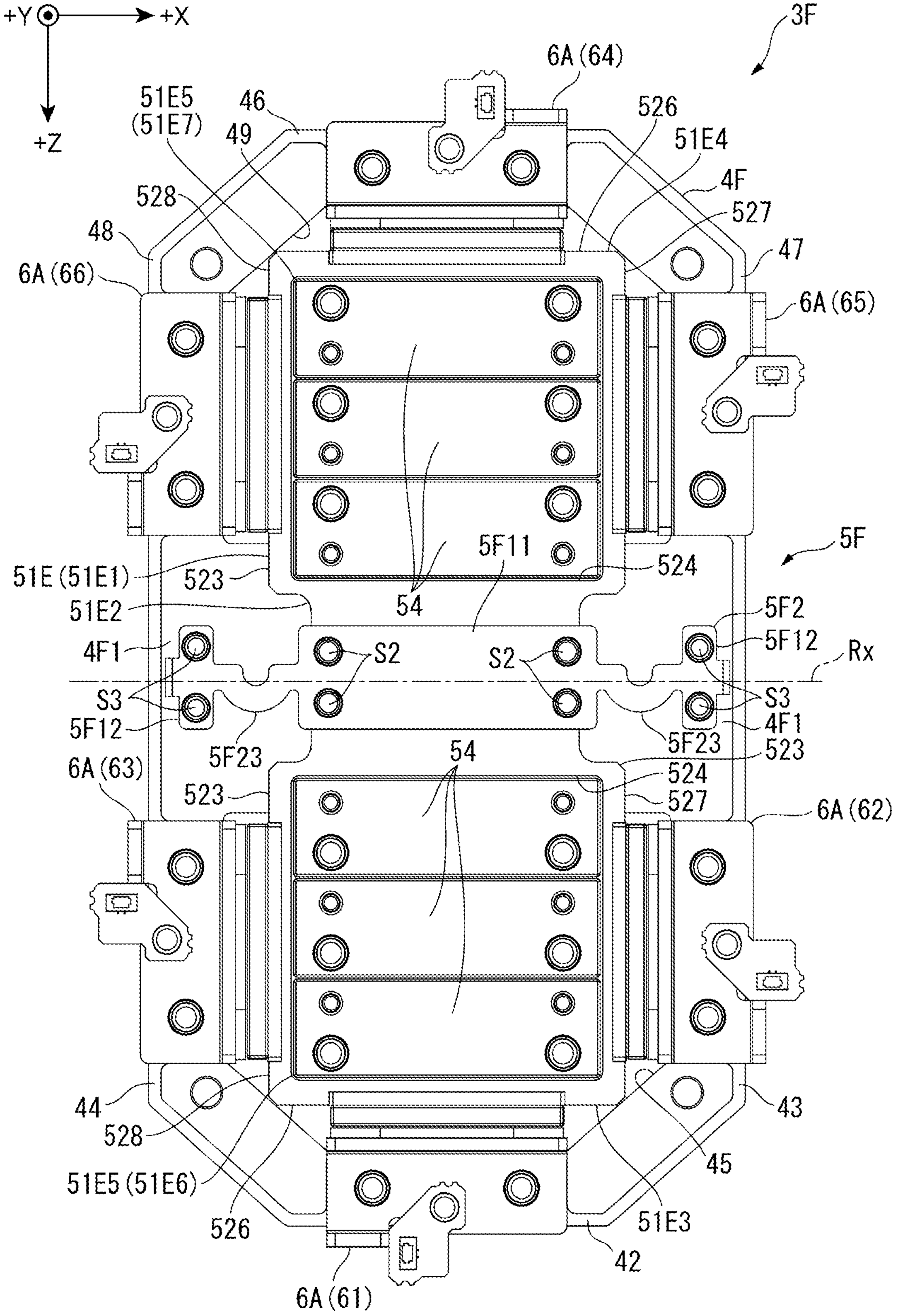
FIG. 21 is a plan view showing a vibration generation device according to a modification of the fourth embodiment.

FIG. 21 is a plan view showing a deformation of the vibration generation device 3F. Specifically, FIG. 21 is a plan view showing a plate member 5F2 that is a deformation of the plate member 5F1 of the vibration generation device 3F.

For example, the vibration generation device 3F may use the plate member 5F2 shown in FIG. 21 instead of the plate member 5F1.

Similarly to the plate member 5F1, the plate member 5F2 is fixed to the attachment portions 4F1 of the base 4F and constitutes the rotation axis Rx of the arm 51E. The plate member 5F2 has the same configuration and function as those of the plate member 5F1 except that the plate member 5F2 includes a pair of torsion portions 5F23 instead of the pair of torsion portions 5F13. That is, the plate member 5F2 includes the fixing portion 5F11, the pair of attachment portions 5F12, and the pair of torsion portions 5F23.

Similarly to the pair of torsion portions 5F13, the pair of torsion portions 5F23 are disposed between the fixing portion 5F11 and the pair of attachment portions 5F12. When the arm 51E is swung with respect to the base 4F by the driving units 61 to 66, the pair of torsion portions 5F23 are twisted around an axis along the +X direction, thereby enabling swing of the arm 51E. That is, an extension line of an axis coupling the pair of torsion portions 5F23 is the rotation axis Rx of the arm 51E.

Each of the pair of torsion portions 5F23 is formed in a substantially U shape that opens in the +Z direction when viewed from the +Y direction. By forming the pair of torsion portions 5F23 in such a shape, a strength of the pair of torsion portions 5F23 can be increased.

Other Modifications of Fourth Embodiment

The vibration generation device 3F described above includes the driving units 61 to 66. However, the vibration generation device 3F is not limited thereto, and may not include at least one of the driving units 61 to 66. In other words, the vibration generation device 3F may include one of the driving units 61 to 66. For example, the vibration generation device 3F may include at least one of the driving units 61 to 63 disposed in the +Z direction with respect to the rotation axis Rx and at least one of the driving units 64 to 66 disposed in the −Z direction with respect to the rotation axis Rx.

The modifications of the first embodiment described above may be applied to the vibration generation device 3F according to the embodiment.

In the arm 51E provided in the vibration generation device 3F according to the embodiment, similarly to the arm 51D according to the second embodiment, the first arm 51E3 and the first weight portion 51E6 may be integrated with each other, or the second arm 51E4 and the second weight portion 51E7 may be integrated with each other.

Further, the arm 51, 51C, or 51D may be supported swingably around the rotation axis Rx by the plate member 5F1 or 5F2 with respect to the base.

Modification of Embodiment

The present disclosure is not limited to the embodiments described above, and modifications, improvements, and the like within a range in which an object of the present disclosure can be achieved are included in the present disclosure.

In the first, third, or fourth embodiment, the weight portion 53 includes at least one weight portion member 54 disposed at the disposition portions 524 and 525. In other words, a plurality of weight portion members 54 can be disposed at the disposition portions 524 and 525. However, the present disclosure is not limited thereto, and for example, a weight portion member selected from a plurality of types of weight portion members which differ in at least one of a weight and a shape may be disposed as a weight portion at the disposition portions 524 and 525.

In the first, third, or fourth embodiment, the arm 51, 51C, or 51E includes the disposition portions 524 and 525. However, the arm 51, 51C, or 51E is not limited thereto, and may include only one of the disposition portions 524 and 525.

In the third or fourth embodiment, each of the first arm 51E3 and the second arm 51E4 provided in the arm 51E includes the disposition portions 524 and 525. However, the first arm 51E3 and the second arm 51E4 are not limited thereto, and only one of the first arm 51E3 and the second arm 51E4 may include the disposition portion at which the weight portion member 54 can be disposed.

In the first, third, or fourth embodiment, the weight portion member 54 constituting the weight portion 53 is formed in a substantially rectangular parallelepiped shape. However, the weight portion member 54 is not limited thereto, and may have another shape. For example, the weight portion member 54 may be formed in a substantially cubic shape.

In the first, third, or fourth embodiment, the weight portion members 54 are disposed along the +X direction at the disposition portions 524 and 525, and a plurality of weight portion members 54 can be disposed at the disposition portions 524 and 525 in a direction orthogonal to the rotation axis Rx when viewed from the +Y directions. However, the weight portion members 54 are not limited thereto, and may be disposed at the disposition portions 524 and 525 along a direction orthogonal to the rotation axis Rx when viewed from the +Y directions. In this case, the plurality of weight portion members 54 may be disposed at the disposition portions 524 and 525 in a direction along the rotation axis Rx.

In the first, third, or fourth embodiment, the weight portion members 54 can be disposed at the disposition portions 524 and 525 in a stacked way. However, the weight portion members 54 are not limited thereto, and may not necessarily be disposed at the disposition portions 524 and 525 in a stacked way. In other words, a configuration of the vibration generation device may be a configuration in which the weight portion members 54 are not disposed in a stacked way.

In the first, third, or fourth embodiment, the arm 51, 51C, or 51E is attachable to and detachable from the base 4A, 4C, 4E, or 4F by attaching and detaching the rotation axis portion 55 or the plate member 5F1 or 5F2 to and from the base 4A, 4C, 4E, or 4F. That is, the arm 51, 51C, or 51E is detachably attached to the base 4A, 4C, 4E, or 4F. However, the arm in the vibration generation device is not limited thereto, and may be attached to the vibration generation device in a non-removable manner.

A configuration in which the arm is detachably attached to a base is not limited to the rotation axis portion 55 and the plate member 5F1 or 5F2, and may be another configuration.

In the second embodiment, in the arm 51D, a rotational torque generated when the arm 51D attached to the base 4A swings varies because shapes and disposition of the weight portion 53 are different. However, the present disclosure is not limited thereto, and the generated rotational torque may be varied depending on other elements such as different materials of the arm 51D.

In the embodiments described above, the magnet 7A or 7B constituting the driving unit 6A is provided at the arm 51, 51C, 51D, or 51E by the plate member 91, and the coil 8A constituting the driving unit 6A is provided at the base 4A, 4C, 4E, or 4F by the holding member 92. However, the coil 8A is not limited thereto, and may be provided in a configuration other than the arm, for example, in the frame 23. In addition, the coil 8A may be provided at the arm 51, 51C, 51D, or 51E, and the magnet 7A or 7B facing the coil 8A in a non-contact manner may be provided at a configuration other than the arm.

In the embodiments described above, the second side surface portion 527 and the third side surface portion 528 of the arm 51, 51C, 51D, or 51E intersect with each other in a direction parallel to the rotation axis Rx. Specifically, the second side surface portion 527 and the third side surface portion 528 are orthogonal to the direction parallel to the rotation axis Rx. However, the second side surface portion 527 and the third side surface portion 528 are not limited thereto, and may be inclined with respect to a virtual plane orthogonal to the rotation axis Rx as long as the second side surface portion 527 and the third side surface portion 528 intersect with a direction parallel to the rotation axis Rx. That is, the phrase "intersecting with a direction parallel to the rotation axis Rx" includes not only a case of being orthogonal to the parallel direction but also a case of being inclined with respect to the virtual plane orthogonal to the parallel direction.

In the embodiments described above, examples in which the vibration reduction device 2 including the vibration generation device 3A, 3C, 3E, or 3F is applied to the projector 1 which is an electronic apparatus are described. However, the electronic apparatus to which the vibration reduction device 2 is applied is not limited to the projector, and the vibration reduction device 2 may be applied to other electronic apparatuses.

In addition, the vibration generation device according to the present disclosure may be used alone as a device that generates vibration, or may be used in the electronic apparatus.

SUMMARY OF PRESENT DISCLOSURE

The present disclosure will be summarized as follows.

A vibration generation device according to a first aspect of the present disclosure includes: a base configured to transmit vibration to an object; an arm provided at the base swingably around a rotation axis; and at least one driving unit including a magnet, and a coil disposed to face the magnet in a non-contact manner, and configured to swing the arm. One of the magnet and the coil is disposed at a position separated from the rotation axis at the arm. The arm includes a disposition portion provided at a position separated from the rotation axis at the arm, and a weight portion detachably attached to the disposition portion.

According to such a configuration, a weight and a center of gravity of the arm swinging with respect to the base can be easily changed by changing a configuration of the weight portion attached to the disposition portion. Therefore, a magnitude of vibration generated by swing of the arm in the vibration generation device can be easily adjusted.

In the first aspect, the weight portion may include at least one weight portion member, and the disposition portion may be configured such that a plurality of the weight portion members are able to be disposed at the disposition portion.

According to such a configuration, a weight and a shape of the weight portion, hence the weight and the center of gravity of the arm can be easily adjusted by adjusting the number and positions of the weight portion members disposed at the disposition portion. Therefore, the magnitude of the vibration generated by the swing of the arm in the vibration generation device can be easily adjusted.

In the first aspect, the weight portion members may be configured to be disposed at the disposition portion in a stacked way.

According to such a configuration, the weight portion member can be further disposed in a stacked way with respect to the weight portion member disposed at the disposition portion. Accordingly, since more weight portion members can be disposed at the disposition portion, the weight and a shape pattern of the weight portion can be increased. Therefore, the weight and a pattern of the center of gravity of the arm can be increased, and therefore the vibration generated by the vibration generation device can be more finely adjusted.

In the first aspect, the weight portion member may be formed in a substantially rectangular parallelepiped shape.

According to such a configuration, the weight portion members can be easily disposed in a stacked way.

In the first aspect, the weight portion member may be disposed along the rotation axis. The disposition portion may be configured such that the plurality of weight portion members are able to be disposed in a direction orthogonal to the rotation axis when viewed from a position facing the disposition portion.

Here, when n the weight portion members are disposed along a direction orthogonal to the rotation axis when viewed from a position facing the disposition portion, a position of the center of gravity of the arm does not greatly change between a case where one weight portion member is disposed at the disposition portion and a case where two weight portion members are disposed at the disposition portion.

In contrast, when the weight portion member is disposed along the rotation axis when viewed from the position facing the disposition portion, since a weight can be easily added to an opposite-side end portion of the arm from the rotation axis, the position of the center of gravity of the arm can be greatly changed between the case where one weight portion member is disposed at the disposition portion and the case where two weight portion members are disposed at the disposition portion. Therefore, the position of the center of gravity of the arm can be easily adjusted.

In the first aspect, the arm may be detachably attached to the base.

According to such a configuration, the weight portion can be disposed at the disposition portion of the arm in a state where the arm is removed from the base. Therefore, the weight portion can be easily disposed at the arm.

A vibration generation device according to a second aspect of the present disclosure includes: a base configured to transmit vibration to an object; an arm detachably attached to the base and swingable around a rotation axis; and at least one driving unit including a magnet, and a coil disposed to face the magnet in a non-contact manner, and configured to swing the arm. One of the magnet and the coil is disposed at a position separated from the rotation axis. The arm is selected from a plurality of types of arms that differ in rotational torque generated by swing of the arm, and is mounted to the base.

According to such a configuration, by changing the arm mounted at the base, the magnitude of the vibration of the vibration generation device generated by the swing of the arm can be adjusted. Therefore, the magnitude of the vibration generated by the vibration generation device can be easily adjusted.

In the second aspect, the arm may include a weight portion disposed at a position separated from the rotation axis, and the plurality of types of arms may differ in at least one of a weight and a shape of the weight portion in the arm.

According to such a configuration, by changing the arm mounted at the base, a rotational torque generated by the swing of the arm can be adjusted, and the magnitude of the vibration generated by the vibration generation device can be reliably adjusted.

A vibration reduction device according to a third aspect of the present disclosure includes: the vibration generation device according to the first aspect or the second aspect; a detection unit configured to detect vibration; and an operation control unit configured to cause the vibration generation device to generate vibration opposite in phase from the vibration detected by the detection unit.

According to configuration, the same effects as those of the vibration generation device according to the first aspect or the second aspect can be achieved. Further, since the vibration generation device can generate the vibration opposite in phase from the vibration detected by the detection unit, the vibration of an installation target of the vibration reduction device can be reduced.

An electronic apparatus according to a fourth aspect of the present disclosure includes the vibration reduction device according to the third aspect.

According to such a configuration, the same effects as those of the vibration reduction device according to the third aspect can be achieved, and vibration of the electronic apparatus can be reduced.

What is claimed is:

1. A vibration generation device comprising:
- a base configured to transmit vibration to an object;
- an arm provided at the base swingably around a rotation axis; and
- at least one driving unit including
  - a magnet, and
  - a coil disposed to face the magnet in a noncontact manner, and configured to swing the arm, wherein
  - one of the magnet and the coil is disposed at a position separated from the rotation axis at the arm, and the arm includes
  - a disposition single recess formed in the arm provided at a position separated from the rotation axis at the arm, and
  - a weight portion detachably attached to the disposition single recess, and wherein
- the weight portion includes at least one weight, and
- the disposition single recess is configured for selectively receiving a plurality of weights disposed at the disposition single recess.

2. The vibration generation device according to claim 1, wherein
- the plurality of weights are configured to be disposed at the disposition single recess in a stacked way.

3. The vibration generation device according to claim 2, wherein
- the at least one weight is formed in a substantially rectangular parallelepiped shape.

4. The vibration generation device according to claim 1, wherein
- the weight single is disposed along the rotation axis, and
- the disposition single recess is configured such that the plurality of weights are able to be disposed in a direction orthogonal to the rotation axis when viewed from a position facing the disposition single recess.

5. The vibration generation device according to claim 1, wherein
- the arm is detachably attached to the base.

6. A vibration generation device comprising:
- a base configured to transmit vibration to an object;
- an arm detachably attached to the base and swingable around a rotation axis; and
- at least one driving unit including
  - a magnet, and
  - a coil disposed to face the magnet in a noncontact manner, and configured to swing the arm, wherein
  - one of the magnet and the coil is disposed at a position separated from the rotation axis,
  - the arm is selected from a plurality of types of arms that differ in rotational torque generated by swing of the arm, and is mounted to the base,
  - a disposition single recess is formed in the arm provided at a position separated from the rotation axis at the arm, and
  - at least one weight is detachably attached to the disposition single recess, and
  - the disposition single recess is configured for selectively receiving a plurality of weights disposed at the disposition single recess.

7. The vibration generation device according to claim 6, wherein
- the plurality of types of arms differ in at least one of a physical weight and a shape of the at least one weight in the arm.

8. A vibration reduction device comprising:
- the vibration generation device according to claim 1;
- a detection unit configured to detect vibration; and
- an operation control unit configured to cause the vibration generation device to generate vibration opposite in phase from the vibration detected by the detection unit.

9. An electronic apparatus comprising:
- the vibration reduction device according to claim 8.

* * * * *